June 2, 1964  B. H. TINGLEY  3,135,462
PRINT RACK RAISING MECHANISM FOR SHORTCUT MULTIPLIER
Original Filed May 12, 1954  18 Sheets-Sheet 1

INVENTOR.
BRUCE H. TINGLEY
BY
John J. Lynch
ATTORNEY.

INVENTOR.
BRUCE H. TINGLEY
BY
ATTORNEY.

June 2, 1964  B. H. TINGLEY  3,135,462
PRINT RACK RAISING MECHANISM FOR SHORTCUT MULTIPLIER
Original Filed May 12, 1954  18 Sheets-Sheet 6

INVENTOR.
BRUCE H. TINGLEY
BY
ATTORNEY.

June 2, 1964  B. H. TINGLEY  3,135,462

PRINT RACK RAISING MECHANISM FOR SHORTCUT MULTIPLIER

Original Filed May 12, 1954  18 Sheets-Sheet 7

INVENTOR.
BRUCE H. TINGLEY

BY

ATTORNEY.

June 2, 1964  B. H. TINGLEY  3,135,462
PRINT RACK RAISING MECHANISM FOR SHORTCUT MULTIPLIER
Original Filed May 12, 1954  18 Sheets-Sheet 8

INVENTOR.
BRUCE H. TINGLEY
BY
John J. Lynch
ATTORNEY.

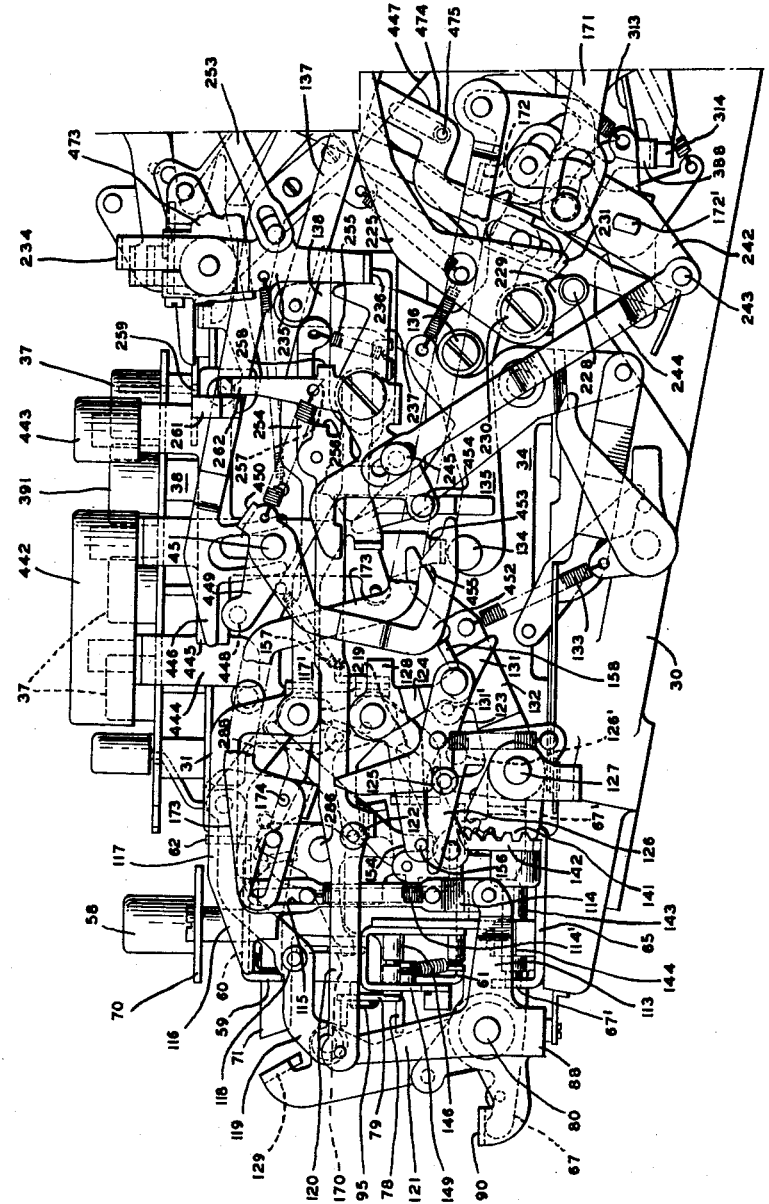

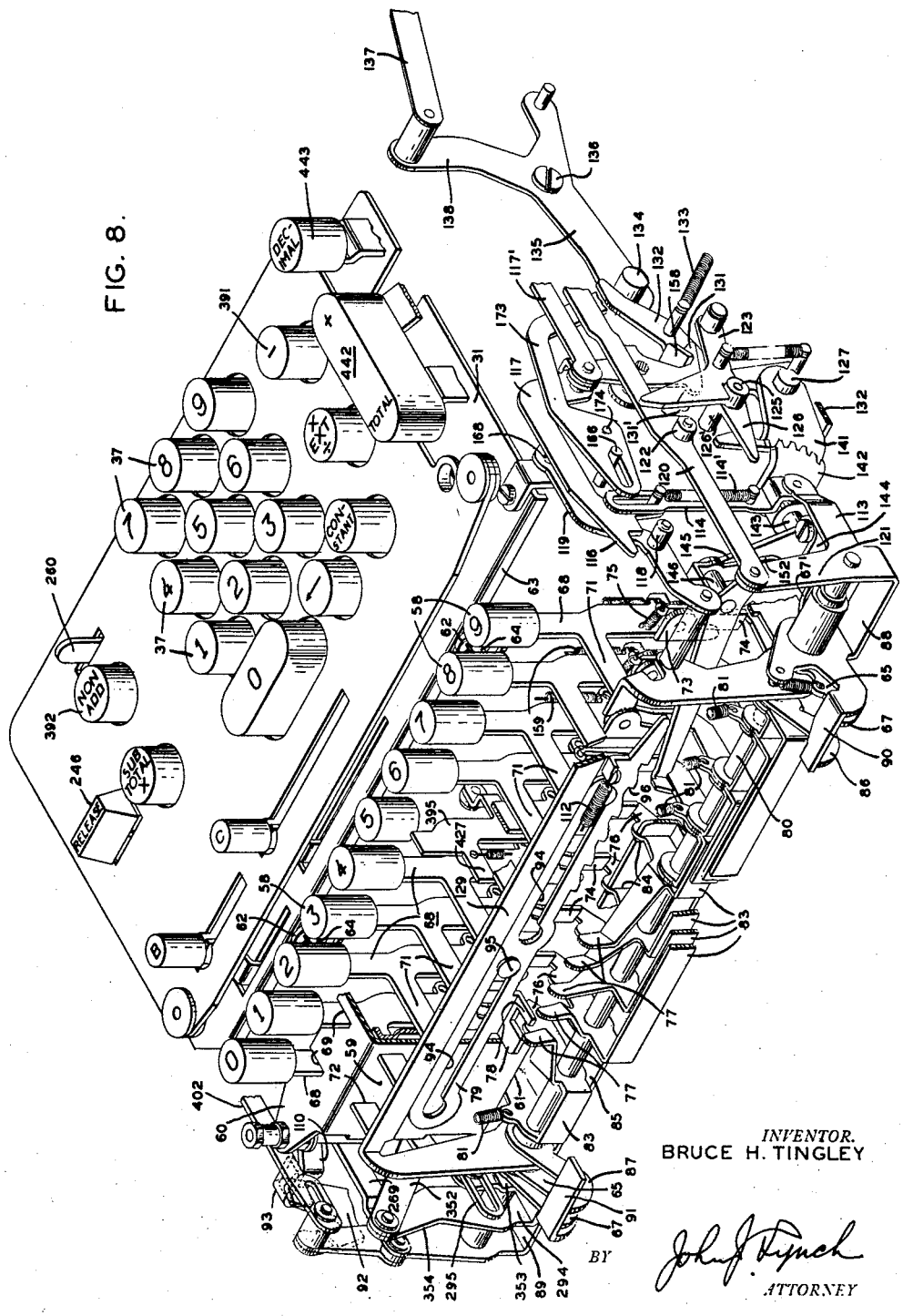

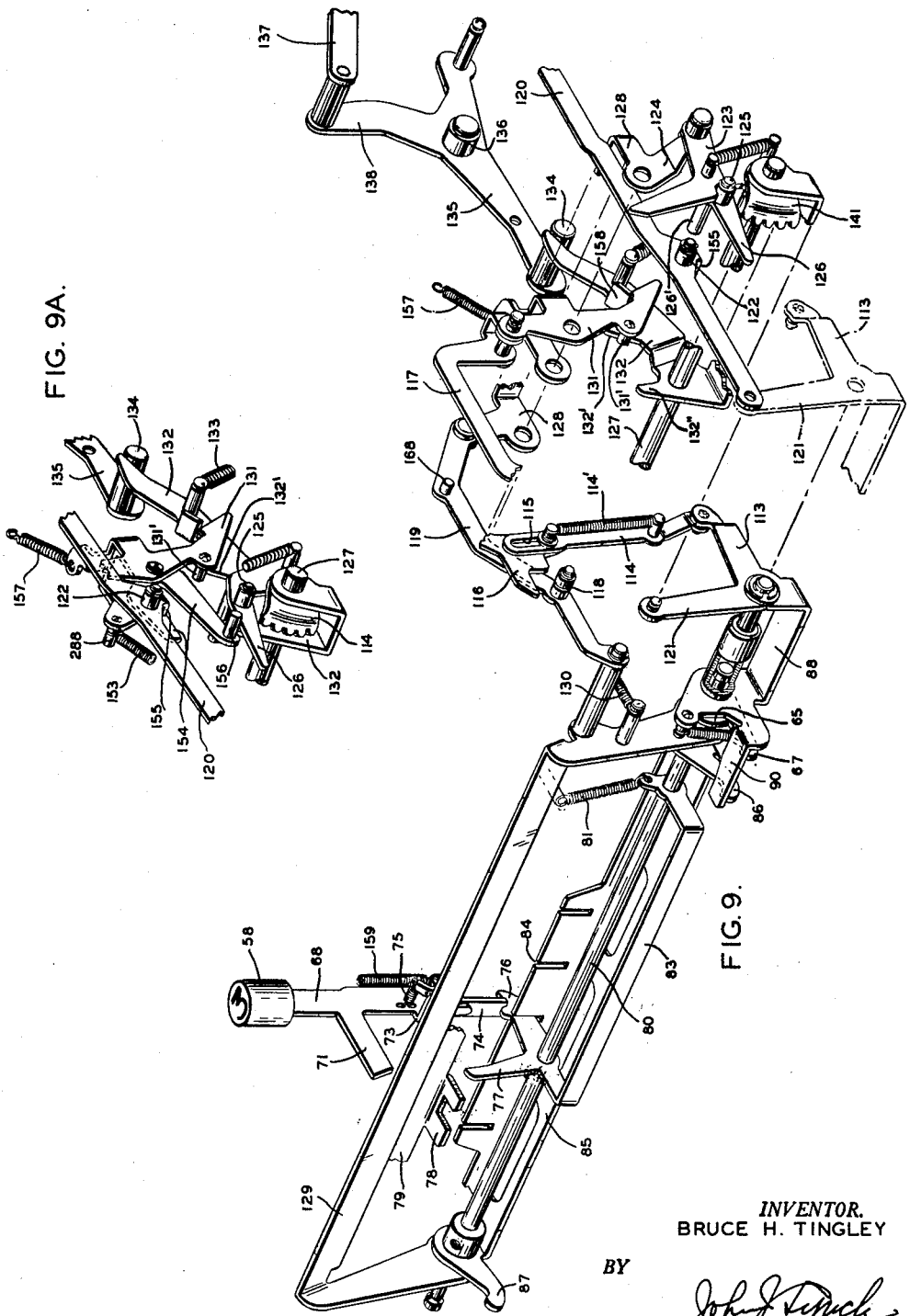

June 2, 1964    B. H. TINGLEY    3,135,462
PRINT RACK RAISING MECHANISM FOR SHORTCUT MULTIPLIER
Original Filed May 12, 1954    18 Sheets-Sheet 12
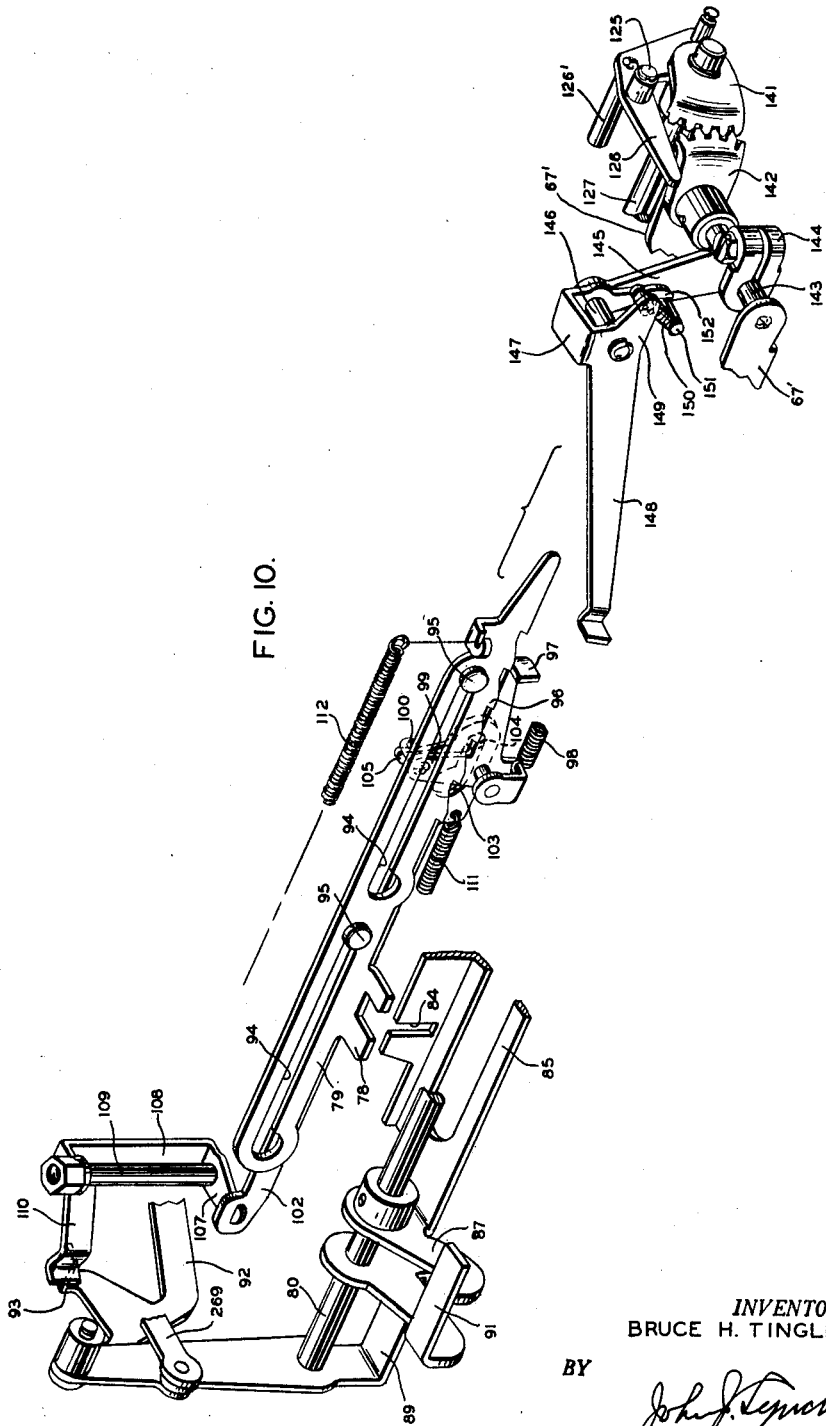
INVENTOR.
BRUCE H. TINGLEY
BY
ATTORNEY.

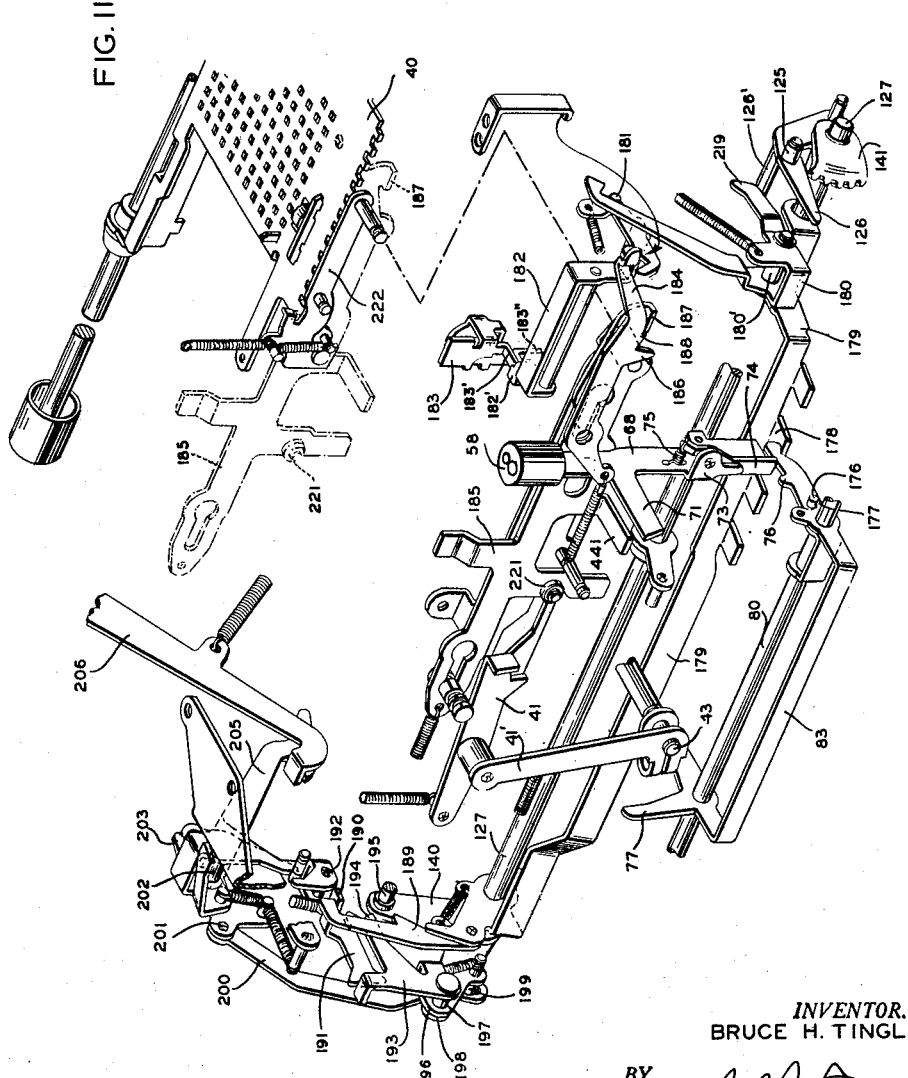

June 2, 1964  B. H. TINGLEY  3,135,462
PRINT RACK RAISING MECHANISM FOR SHORTCUT MULTIPLIER
Original Filed May 12, 1954  18 Sheets-Sheet 14

INVENTOR.
BRUCE H. TINGLEY
BY
ATTORNEY.

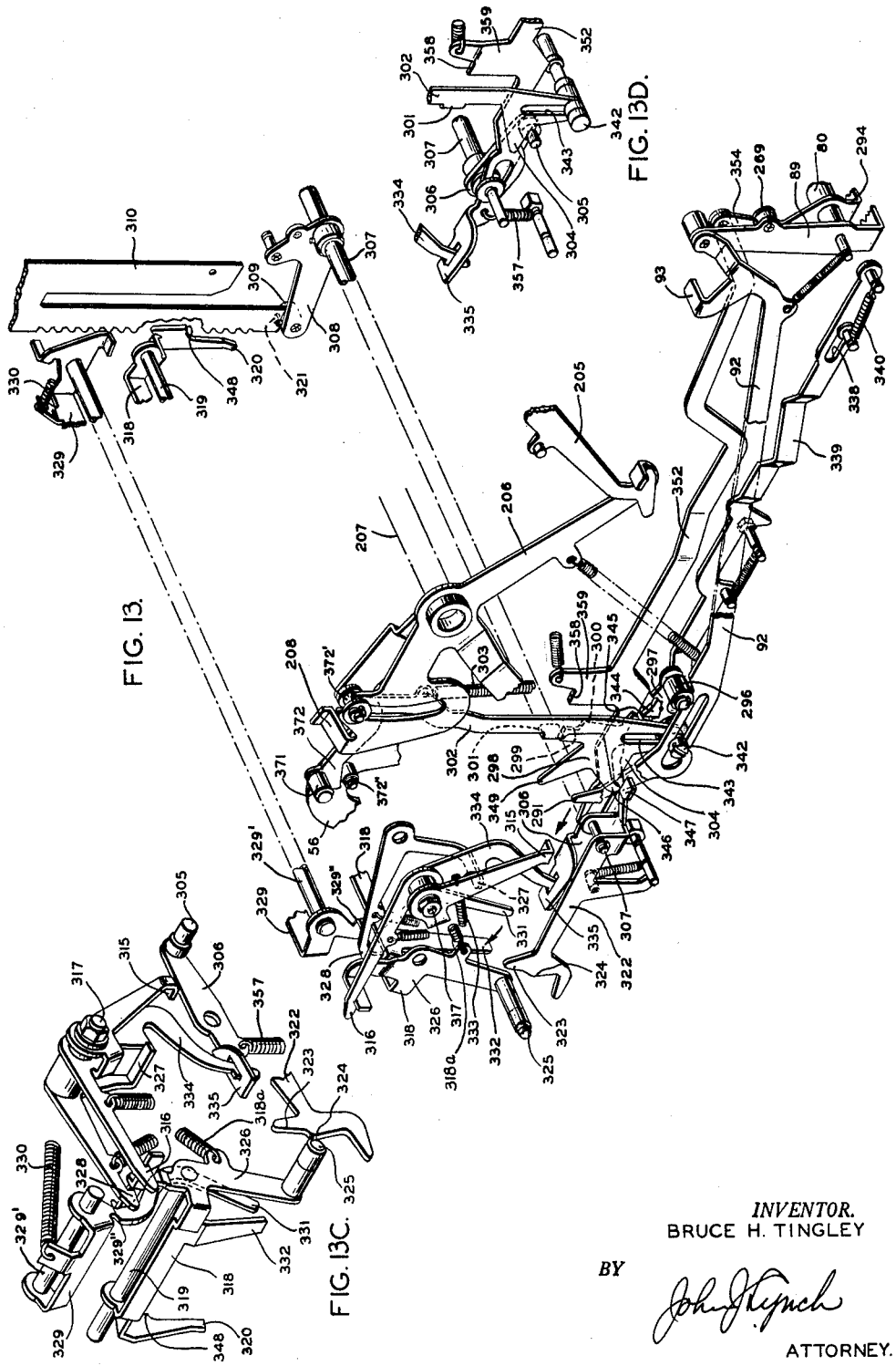

June 2, 1964 B. H. TINGLEY 3,135,462
PRINT RACK RAISING MECHANISM FOR SHORTCUT MULTIPLIER
Original Filed May 12, 1954 18 Sheets-Sheet 16
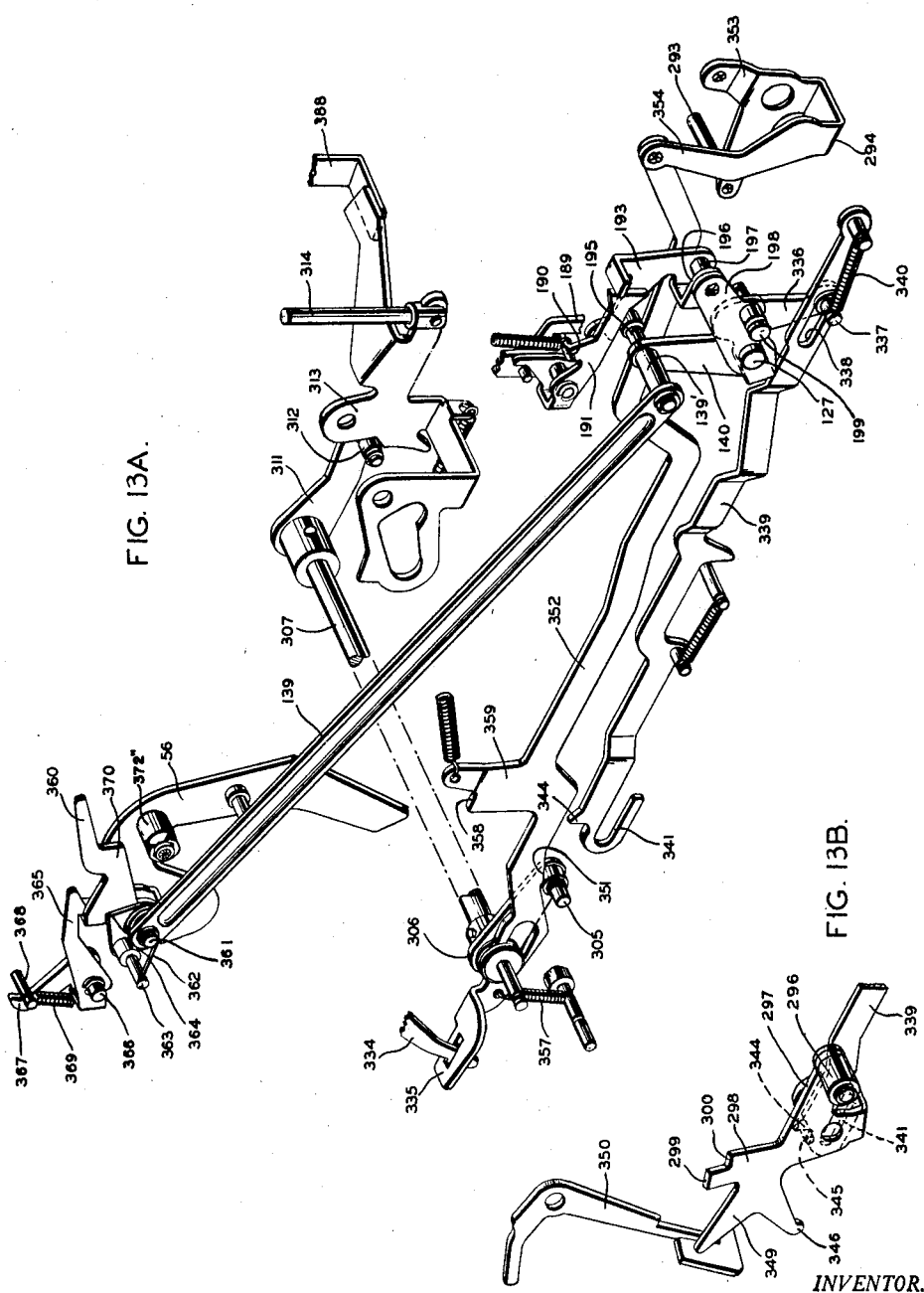
INVENTOR.
BRUCE H. TINGLEY
BY
ATTORNEY.

June 2, 1964   B. H. TINGLEY   3,135,462
PRINT RACK RAISING MECHANISM FOR SHORTCUT MULTIPLIER
Original Filed May 12, 1954   18 Sheets-Sheet 17

INVENTOR.
BRUCE H. TINGLEY
BY
ATTORNEY.

United States Patent Office 3,135,462
Patented June 2, 1964

3,135,462
PRINT RACK RAISING MECHANISM FOR SHORTCUT MULTIPLIER
Bruce Harrison Tingley, Pine City, N.Y., assignor, by mesne assignments, to Sperry Rand Corporation, New York, N.Y., a corporation of Delaware
Original application May 12, 1954, Ser. No. 429,277, now Patent No. 2,984,411, dated May 16, 1961. Divided and this application Sept. 27, 1960, Ser. No. 58,814
14 Claims. (Cl. 235—60)

This invention relates to new and useful improvements in calculating machines and has particular reference to improvements in the ten-key key-set type of calculator; being a division of my co-pending application Serial No. 429,277, filed May 12, 1954, now Patent No. 2,984,411, dated May 16, 1961.

The particular machine wherein this invention is embodied is an improvement over the machines disclosed in U.S. patents to Walter W. Landsiedel, 2,203,336; 2,229,980; 2,237,881; 2,255,622; 2,688,439 and 2,726,037 in his name as follows:

It is more directly an improvement over Patents Nos. 2,688,439 and 2,726,037, more especially the latter which shows a calculator adapted to perform multiplication by a short cut method.

In the Patent 2,726,037 provision was made for short cut multiplication wherein the multiplicand was entered in the usual fashion and spaced in accordance with the number of digits in the multiplier. Then a short cut key was depressed, after which the multiply lever was pushed rearwardly and held for the proper number of cycles for each digit of the multiplier. As before, the machine would cycle through a blank and total stroke and print the product. The multiplicand and the first multiplier digit were printed at the end of cycling of the first digit. Subsequent multiplier digits were printed at the end of their respective series of cycles.

To facilitate the operation a dial was provided which indicates the succesive cycles, so that the multiply lever could be released at the proper time.

The parent application, now Patent No. 2,984,411, is directed to the provision of mechanism to eliminate the dial and the lever altogether, and to provide a series of multiplier keys in addition to the regular keyboard so that after the multiplicand is entered and properly spaced it is merely necessary to press the desired multiplier key corresponding to the multiplier digit being entered into the machine, and the machine will take over and automatically cycle the proper number of times and then automatically take a total and print the product. There are no dials to watch or levers to hold and release. Just press down the proper key for the successive digits to be cycled.

The present invention is directed to the provision of improved mechanism for the printing of multiplier and quotient digit symbols in response to selective actuation of multiplier keys.

The preferred form of the invention is shown in the accompanying drawing with the cover casing removed, and in which FIG. 1 is a front elevation of the multiplier keyboard;

Figure 4:
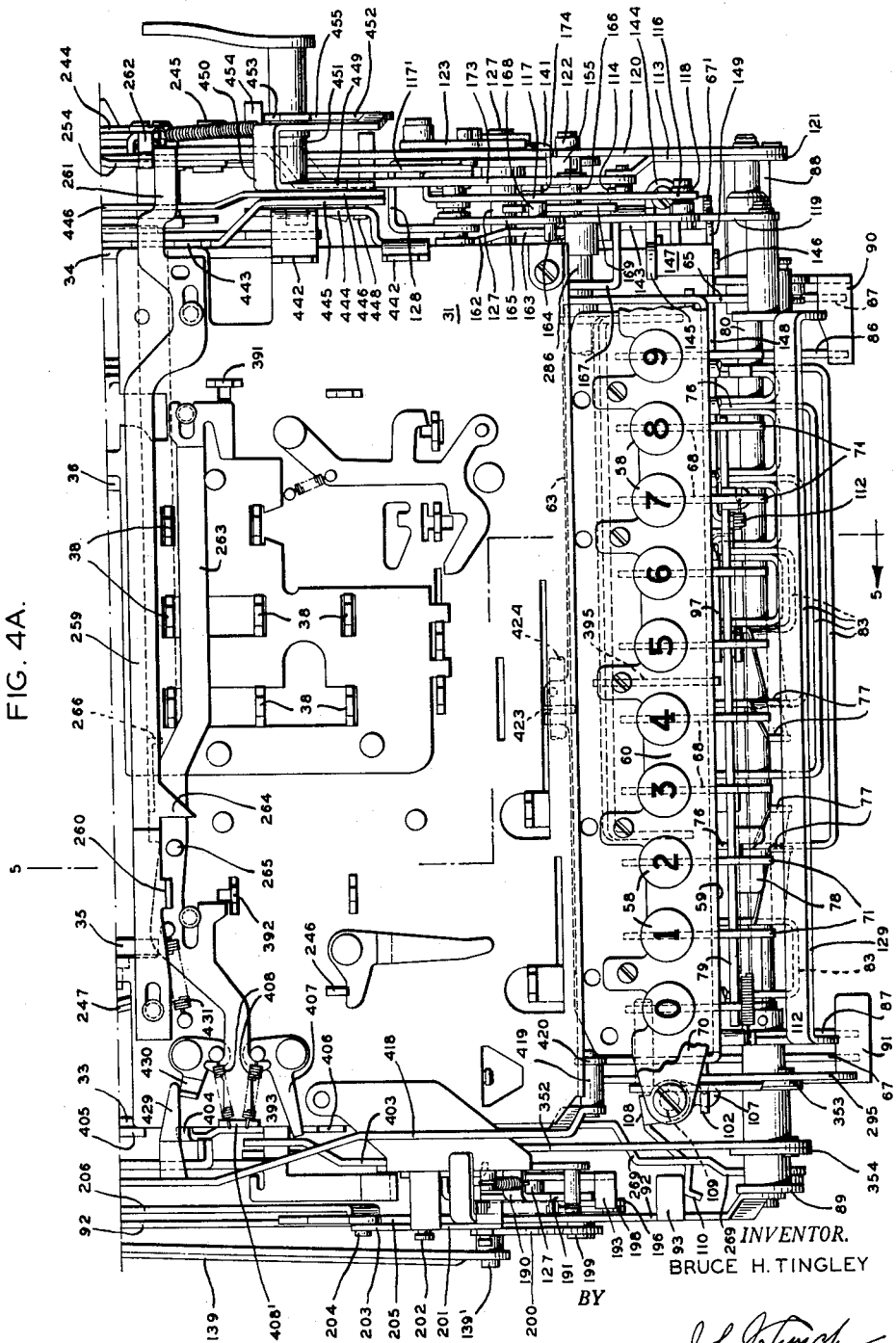
Figure 5:
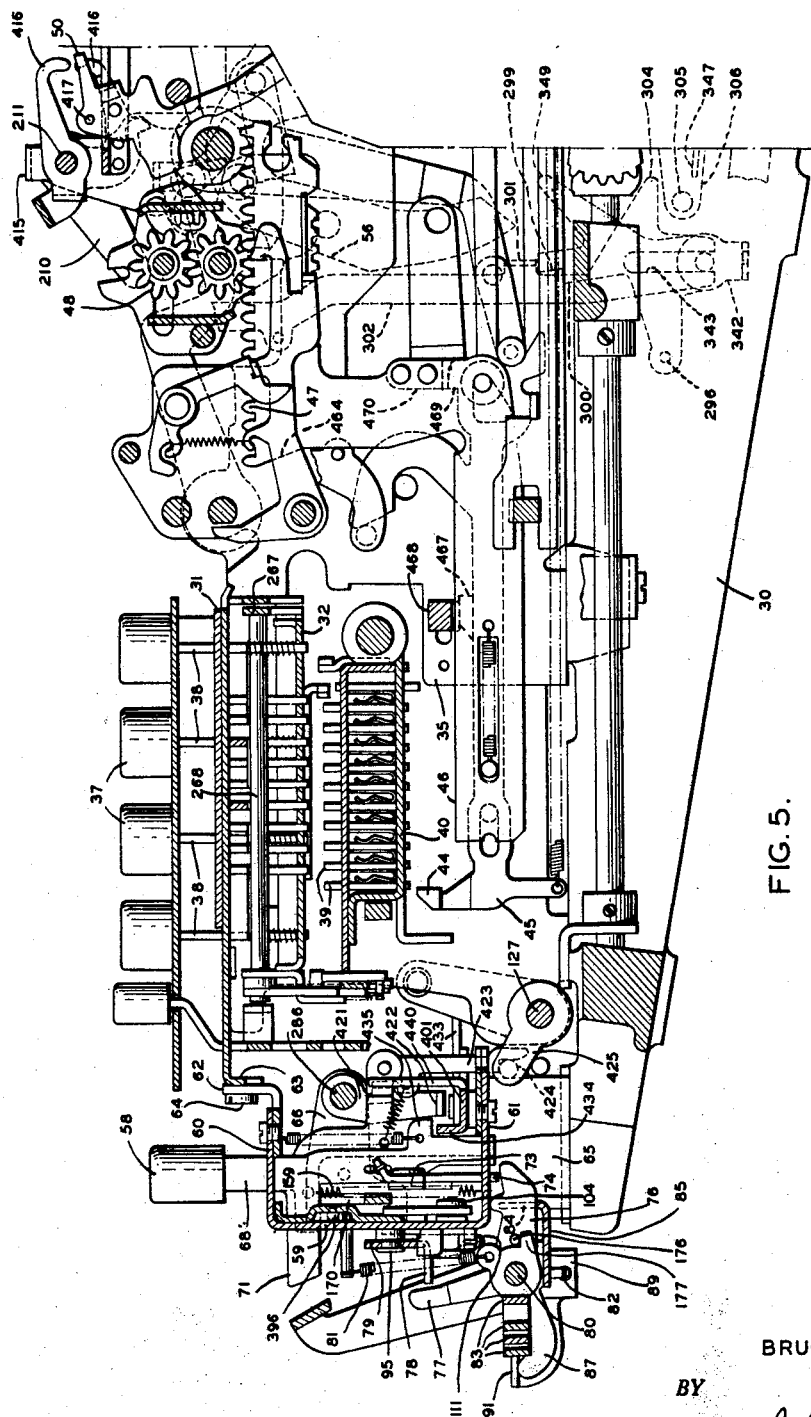
Figure 5A:
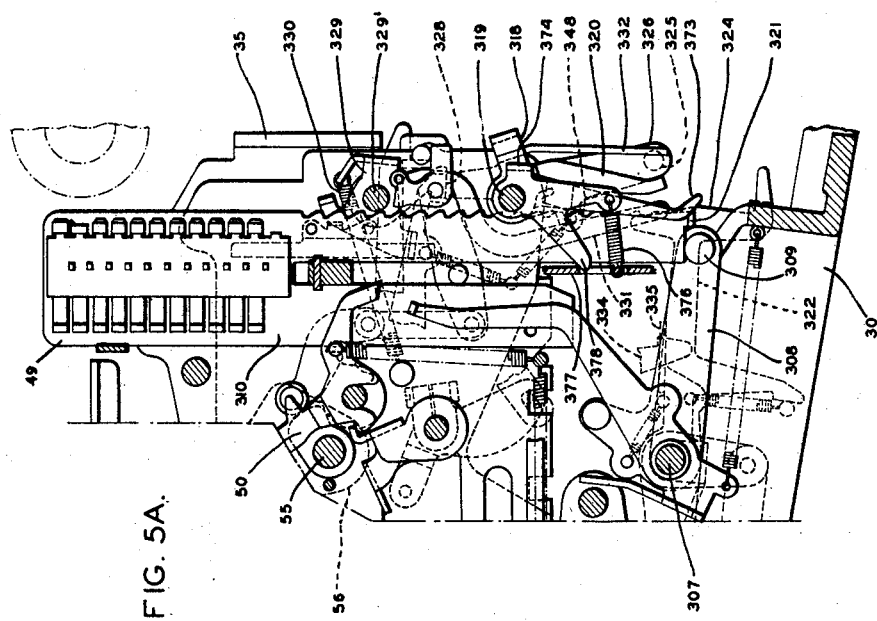

FIGS. 4 and 4A taken together constitute a plan view of the machine with the casing and the keyboard removed, but with the multiplier keyboard in position;

FIGS. 5 and 5A taken together constitute a vertical longitudinal section taken approximately on the line 5—5 of FIGS. 4 and 4A.

Figure 6:
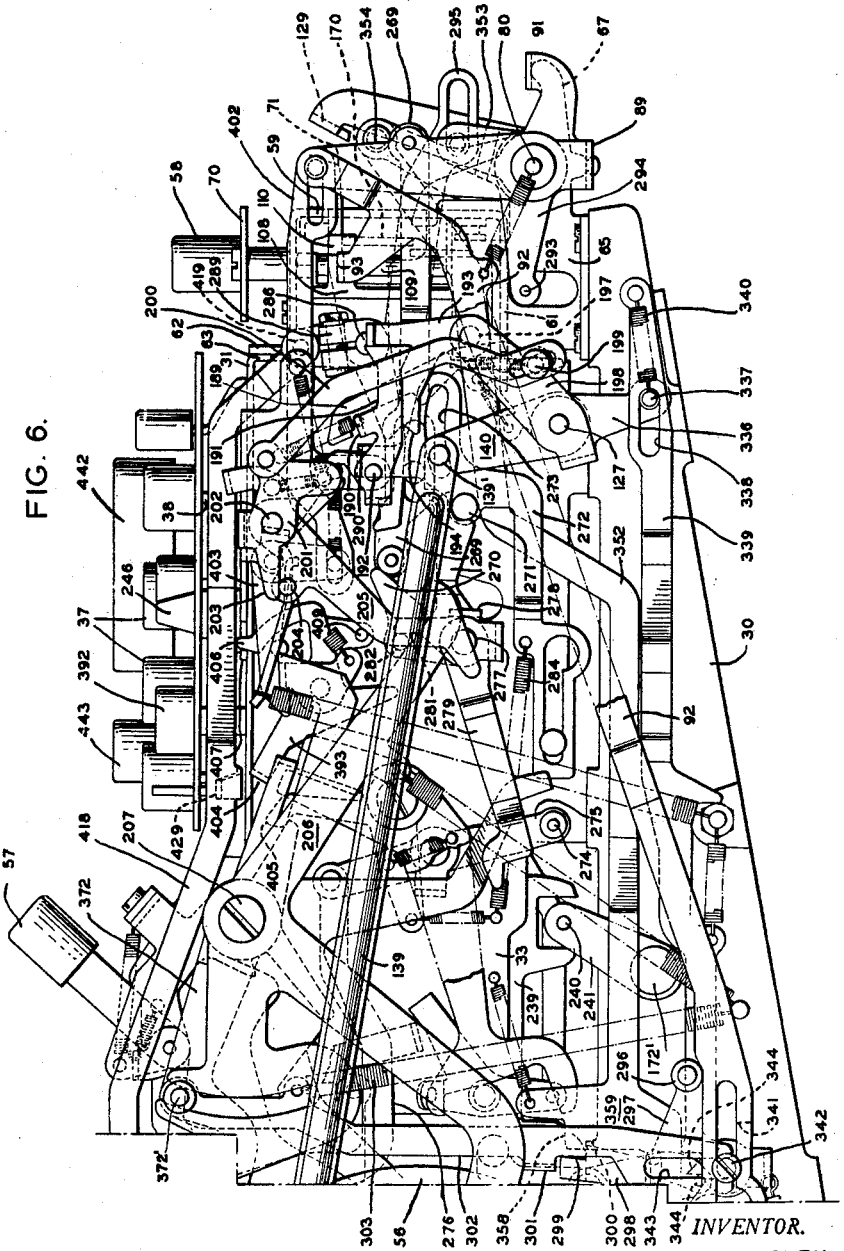
Figure 6A:
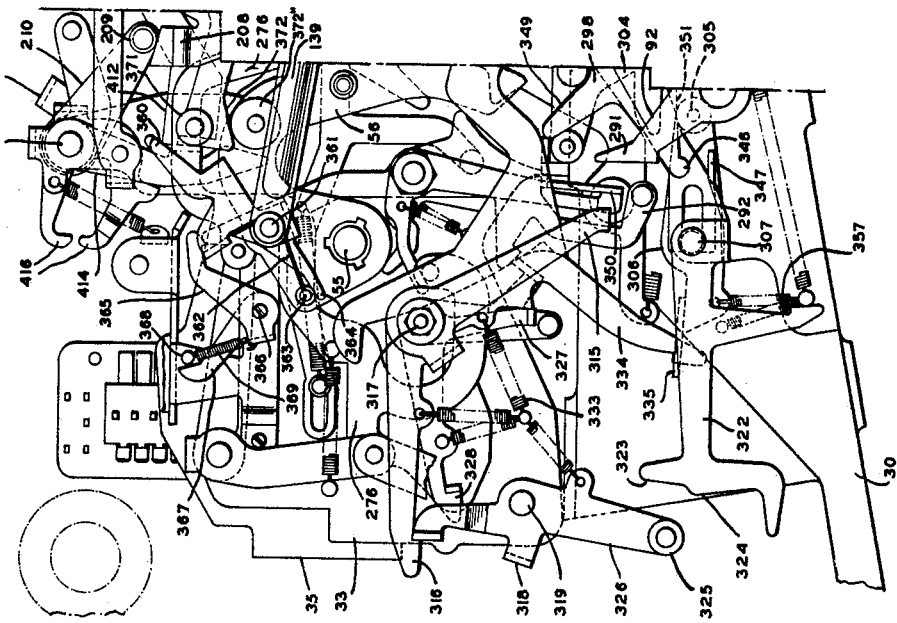
Figure 7A:
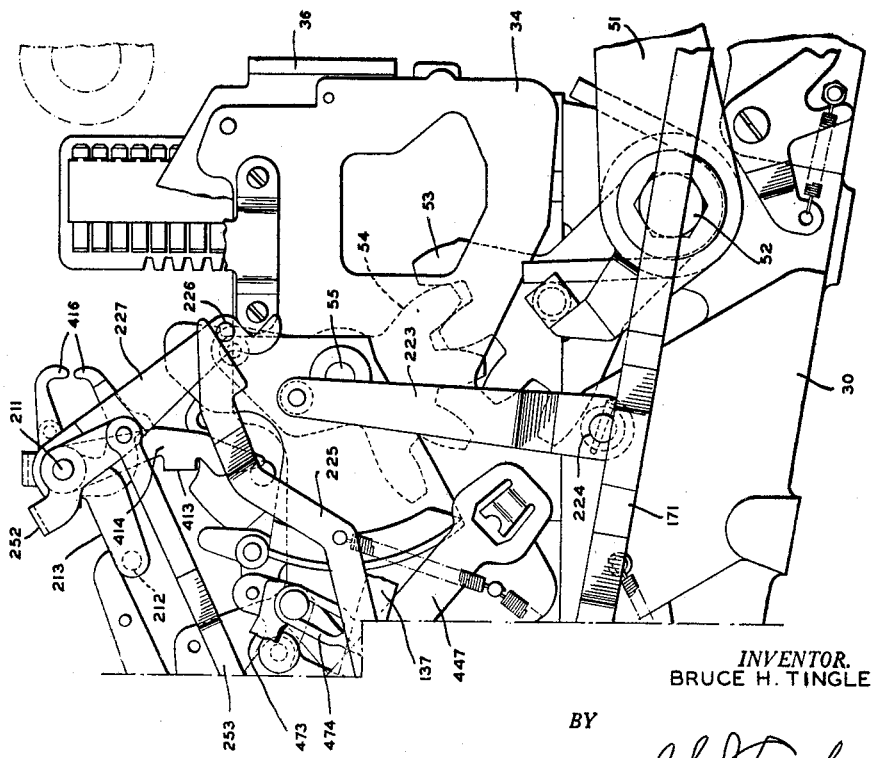
Figure 12:
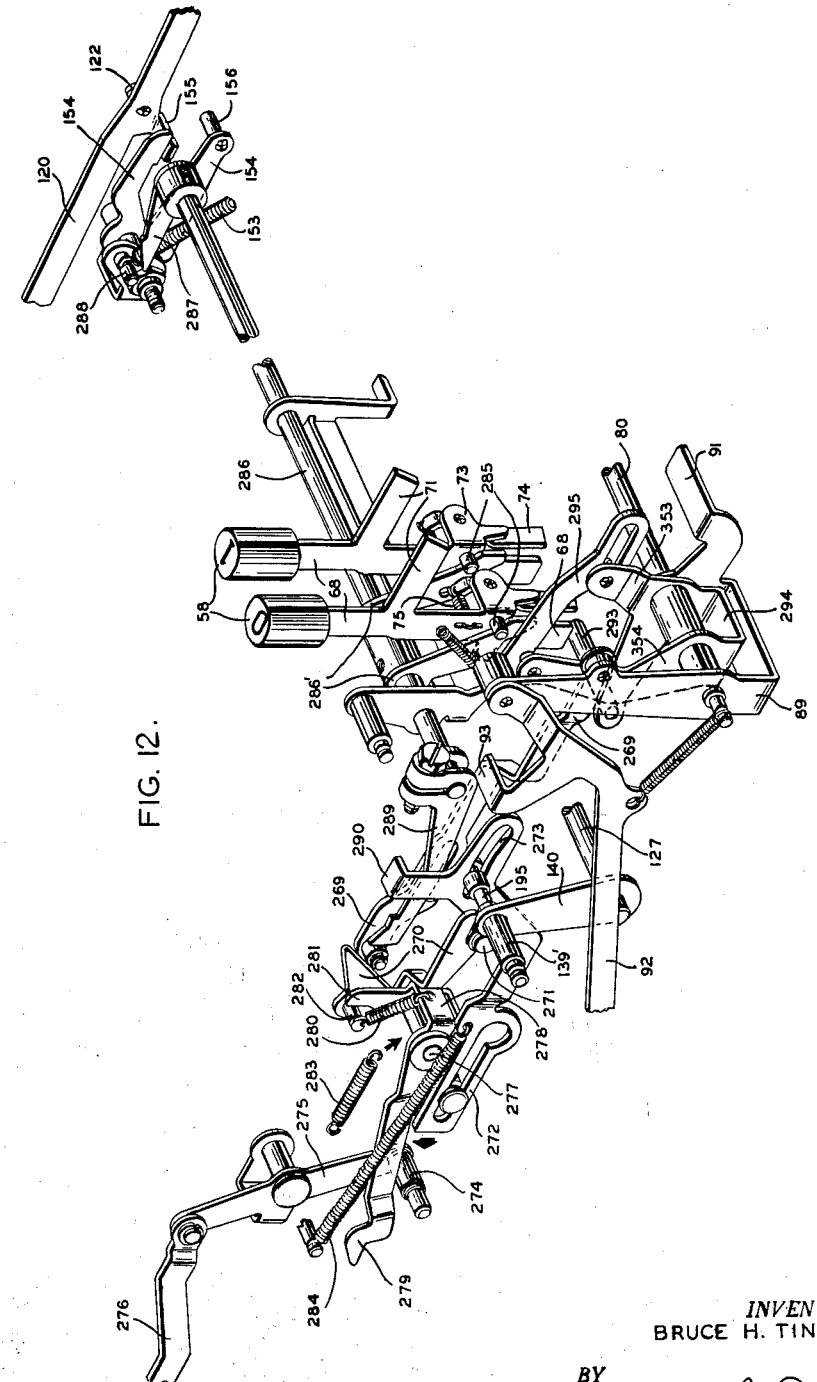
Figure 14:
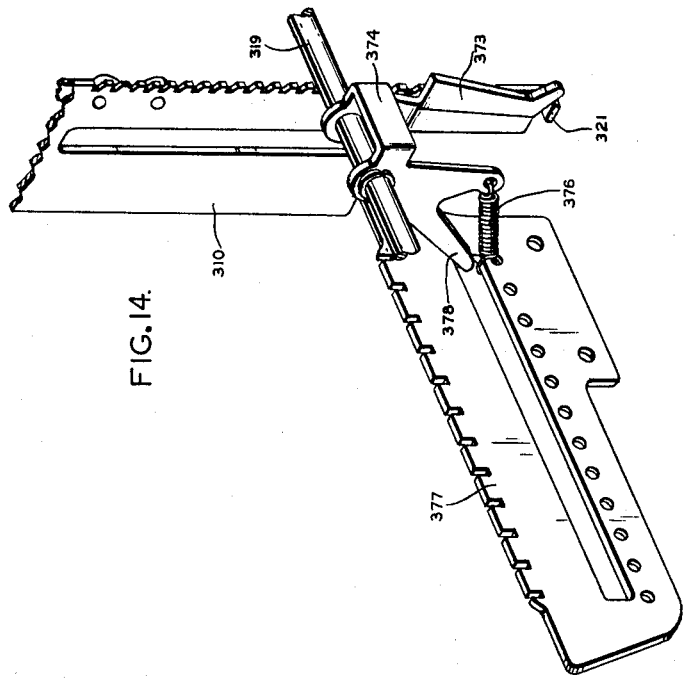
Figure 15:
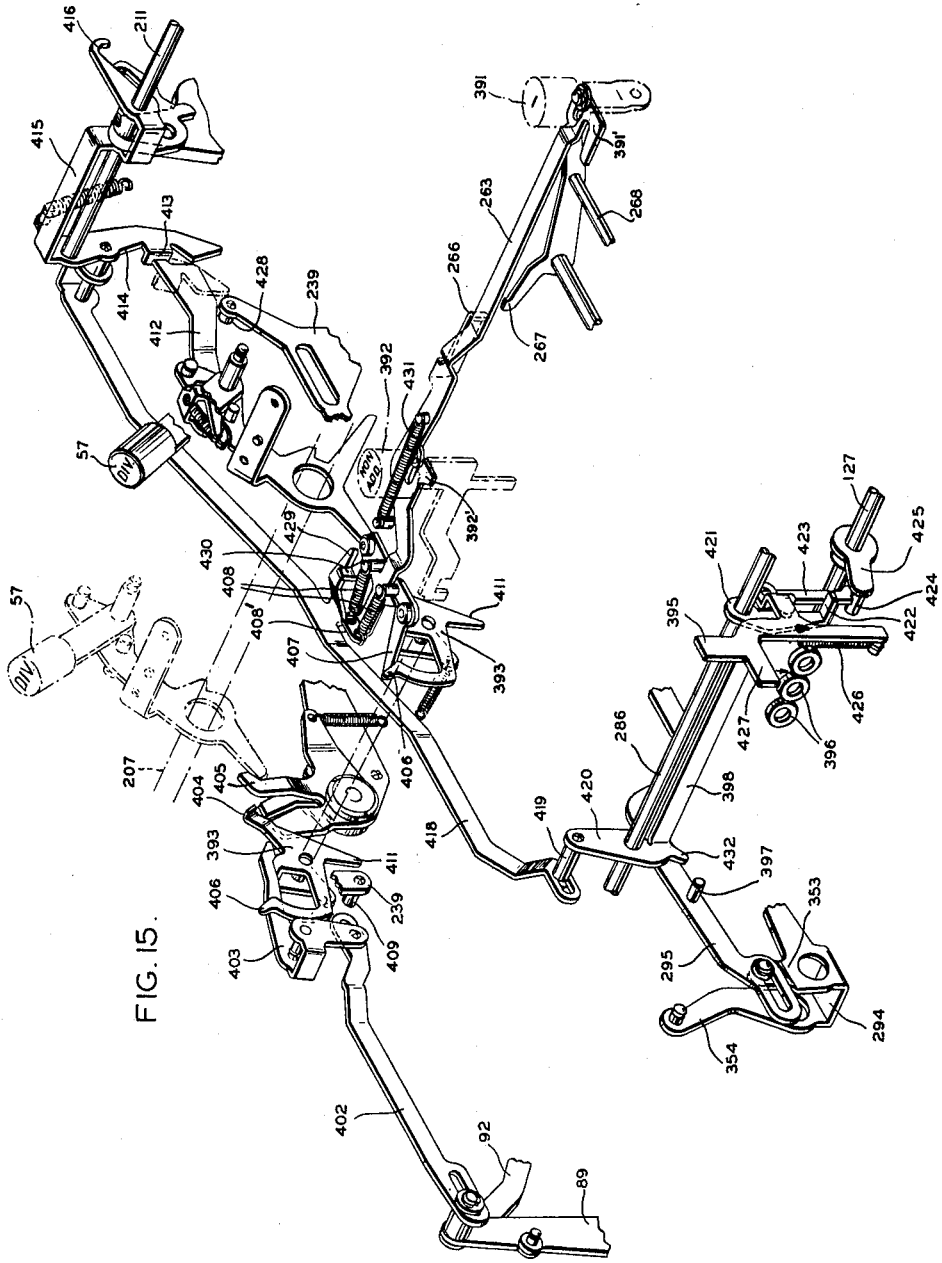

FIGS. 6 and 6A taken together constitute a left side elevation of the machine;

FIGS. 7 and 7A taken together constitute a right side elevation of the machine;

FIG. 8 is a partial perspective view of the front end of the machine showing the main keyboard and the multiplier keyboard;

FIG. 9 is a perspective view of certain parts having to do with the operation of the "two" through "five" keys with some portions of it shown in exploded relation;

FIG. 9A is a detail perspective showing some of the parts of FIG. 9 in their normal relation;

FIG. 10 is an enlarged perspective of an operating slide and associated parts;

FIG. 11 is an exploded perspective of mechanism in short cut multiplication particularly the escapement mechanism and the non-print control mechanism;

FIG. 12 is a perspective of mechanism involved when the "zero" or "one" key are depressed, with some parts exploded and some omitted;

FIG. 13 is a perspective of the mechanism for operating the quotient rack with some parts exploded;

FIG. 13A is a perspective of other parts of the mechanism of FIG. 13 with some parts exploded and some others omitted;

FIG. 13B is a perspective detail of FIG. 13 showing the mechanism to backspace and step up the M and Q rack five positions;

FIG. 13C is a partial rear perspective of the latches and bails employed in connection with the blocking and holding of the M and Q rack;

FIG. 13D is a detail perspective drawn out of FIG. 13 to avoid confusion;

FIG. 14 is a detail perspective of the rack snubbing device;

FIG. 15 is a perspective of certain key interlock mechanisms in partly exploded form.

FORMER GENERAL STRUCTURE

Figure 3:
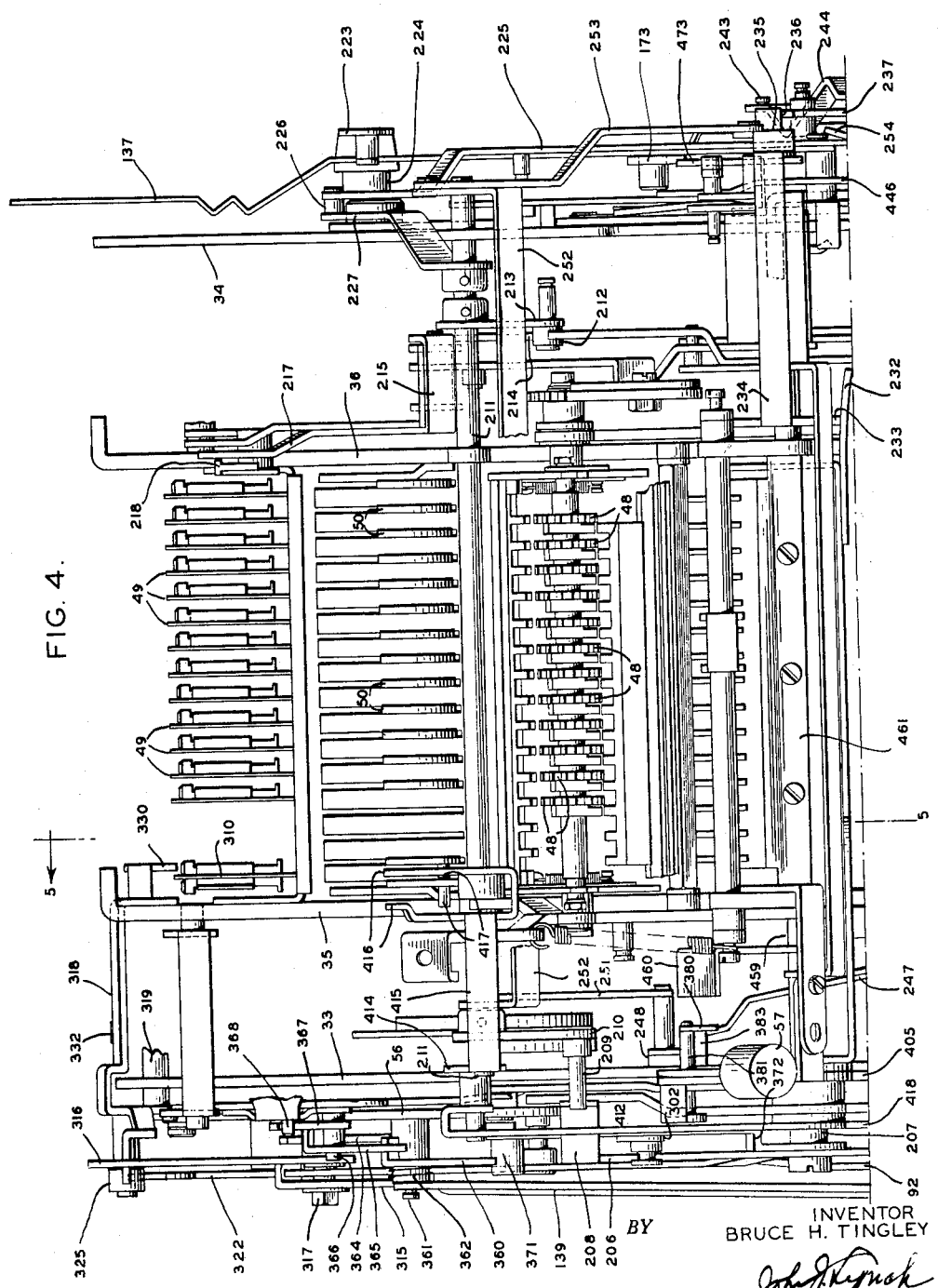
FIG. 3 is a front elevation of the machine with the multiplier keyboard removed, and with certain parts at the sides shown in section.

The machine on which the herein improvements are imposed is of the type shown in the cited references above, especially that shown in Patent 2,726,037 and involves a base plate 30, upper and lower keyboard plates 31 and 32, outer vertical plates 33 and 34 and inner vertical plates 35 and 36 suitably braced (see FIGS 4 and 5). The regular digit keys 37 have stems 38 which are depressed to set pins 39 on a pin carriage 40 which is escaped step by step in the usual manner by means not shown herein, but shown in FIG. 6 of Patent 2,726,037 above. The pin carriage 40 (FIG. 5) is backspaced by means of pawl 41 (FIG. 3) cooperating with backspace rack 42 in the usual manner through operation of arm 41' and backspace shaft 43. The set pins 39 are, when set, disposed in the path of lips 44 on slides 45 cooperating with adding racks 46, the teeth 47 of which, mesh with the accumulator wheels 48 (FIG. 5). These racks also mesh with pinions (not shown) to elevate the type racks 49 (FIGS. 4 and 5). The printing hammers 50 are fired generally in the manner as set forth in FIG. 1 of Patent 2,203,336. The machine is driven by an electric motor (not shown) but generally as shown in FIG. 6 of Patent 2,229,980 above, and this action oscillates bellcrank 51 (FIG. 7A) pivoted at 52 and having a gear sector 53 meshing with a similar sector 54 fixed to main shaft 55. On the opposite end of the main shaft 55 is the backspace cam 56 (FIG. 6A) described and shown as part 194 (FIG. 3 of Patent 2,726,037). There is also shown the division lever of key 57 (FIG. 6) and its associated elements which are in the main the same as in the above Patent 2,726,037 (FIG. 3 thereof). The general structure and operation of the present machine is in many respects the same as the patent above, and any changes and alterations thereof will be taken up in connection with the description of the structure and operation of the improvements which constitute this invention, and which are in one or another manner related to the regular elements.

STRUCTURE AND OPERATION OF IMPROVEMENTS

It should be recalled that in the machine of the invention, instead of pushing a multiply lever and watching a dial, it is merely necessary, after the multiplicand has been properly entered in the pin carriage, to press the proper multiplier digit key to start the machine and multiply by that digit. If that is the only multiplier digit involved in the operation, the machine will automatically proceed to take a total. Otherwise, the next digit key is depressed until the last multiplication has taken place, whereupon the machine will proceed to take and print the total. This last operation involves two cycles. When the first multiplier digit is cycled, on the last cycle of this series of multiplication cycles, the digit involved and the multiplicand are printed. Further multiplication cycles for other digits of the multiplier will involve only the printing of the multiplier digit until the printing of the total or product as above stated.

Figure 1:
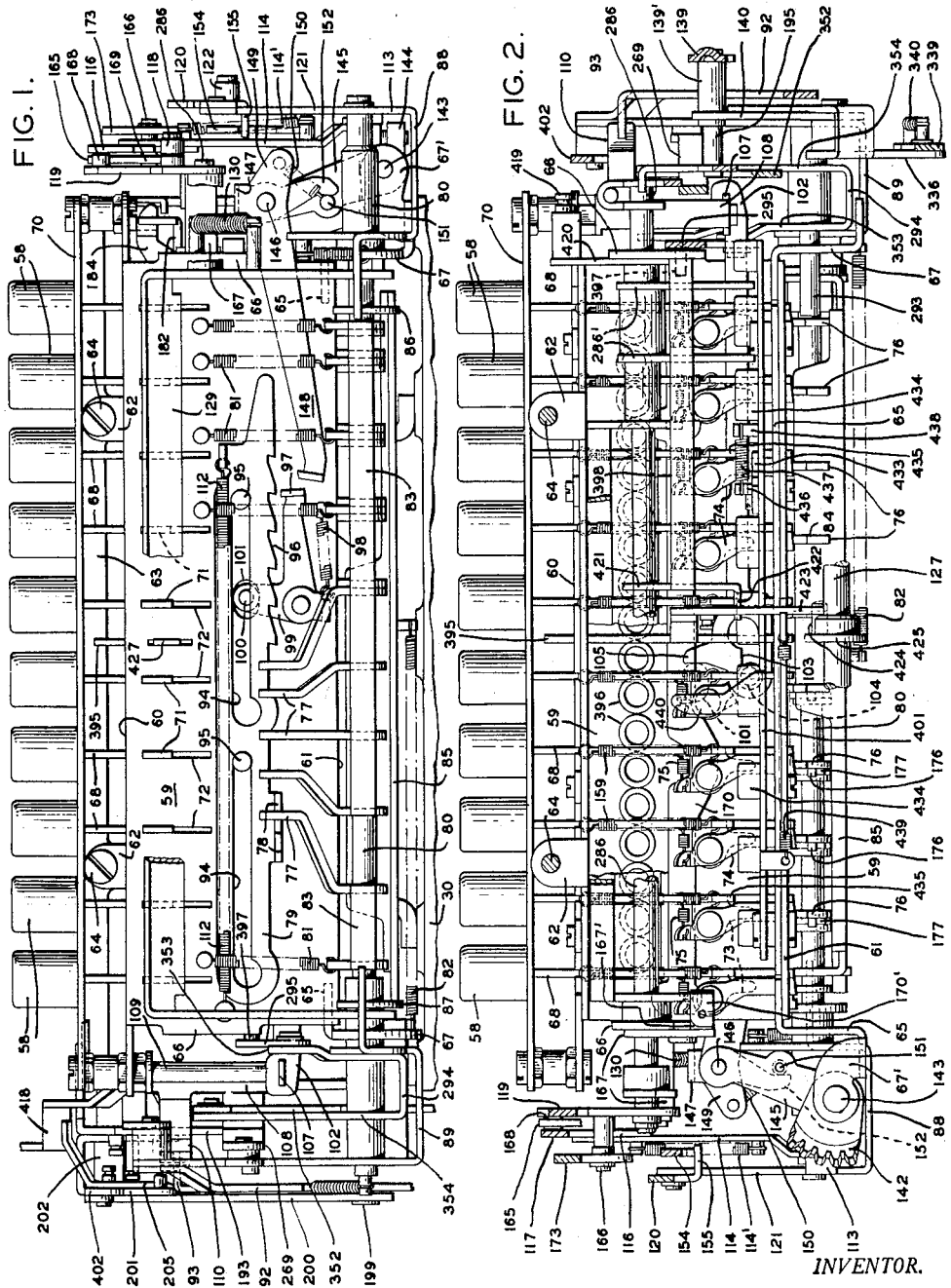
Figure 2:
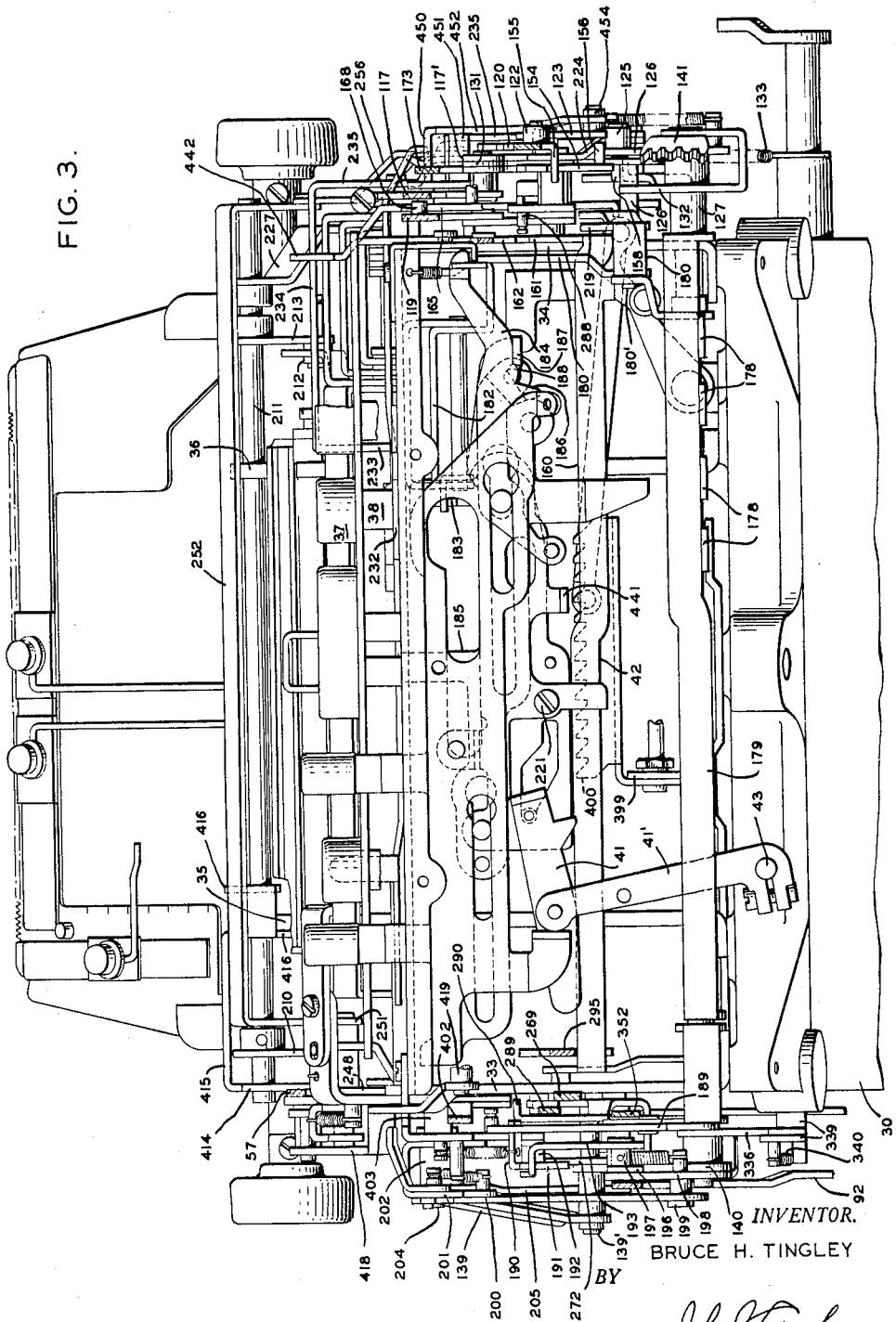
FIG. 2 is a rear elevation of the multiplier keyboard removed from the machine.

A main feature of the present invention resides in a multiplier keyboard which is attached to the front of the machine and supports a plurality of multiplier digit keys 58 representing the digit values from 0 to 9. These are supported on a C-shaped frame having a vertical wall 59 (FIG. 5), top and bottom rearwardly extending walls 60 and 61. The rear of the top wall 60 is secured to an angle member having apertured ears 62 permitting the frame to be fastened by means of screws 64 to a cross bar 63 on the front of the main body of the machine. Secured to the bottom wall 61 is a member 65 having dependent L-shaped ends apertured on their base portions and screwed to the base plate 30 of the machine (FIG. 6). The opposite vertical edges of wall 59 have rearwardly extending flange plates 66 (FIGS. 1, 2 and 5). The L-shaped members 65 have forwardly extending flanges 67 acting as journals for certain shafts and rods later mentioned.

The multiplier keys 58 have stems 68 which are guided in slots 69 (FIG. 8) in the top and bottom walls 60 and 61 of the unit frame. The enlarged heads of the keys are guided in openings (not shown) in a cross plate 70 (FIG. 2) supported above and parallel to the top wall 60 of the frame of the unit. The stems 68 have forwardly projecting fingers 71 extending through slots 72 in the front wall 59 of the C frame to prevent angular turning of the stems (FIG. 1). The lower portion of the keys stems 68 having laterally turned ears 73 (FIG. 11) to which are pivoted pawls 74 to the upper end of which are connected springs 75 fastened to the stems 68. In general the depression of a "two" to "five" key 58 (FIG. 9) will cause the pawl 74 to bear down on one arm 76 of a bell-crank, the other arm 77 of which acts as a block arm and, when a key is depressed, is disposed in the path of movement of forwardly extending spaced ears 78 of a step-by-step slide member 79. The arm 76 is positioned in a comb plate 85 which is spring urged to the right by a spring 82 (FIG. 2). When an ear 78 contacts the block arm 77, which is disposed in its path, it moves the arm 77 and the comb plate 85 which are pivotally and slidably mounted on cross rod 80, to the right, thus releasing its cooperating arm 76 from the pawl 74. The arm 76 then rocks counterclockwise (FIG. 9) under the influence of springs 81 out of contact with ears 78 and is moved to the right to normal position under the influence of spring 82 acting on comb-plate 85 (FIG. 2). After the ear 78 contacts the arm 77 and releases it, the key stem 68 does not restore until the next stroke, as will later be seen. Therefore, when the block arm 77 moves to the left (FIG. 9) the pawl 74 will yield to the left thus removing pressure from the key stem. The key stem is now free to restore when unlatched. It will be seen from FIGS. 4A and 8 that bails 83 are connected respectively between the arms 76 associated with the keys 2 and 9, the keys 3 and 8, the keys 4 and 7, the keys 0 and 1, and the keys 5 and 6. It can be perceived from FIGS. 1 and 8 that there are ten arms 76, but only five block arms 77. Therefore, it is equally obvious that the operation keys 0 and 1 will set up a common block arm; the operation of key 9 will set up the block arm associated with key 2; the operation of key 8 will set up the block arm associated with key 3; the operation of key 7 will set up the block arm associated with key 4; and the operation of key 6 will set up the block arm associated with key 5. As will later be apparent this is for the purpose of setting up multiplication by the complementary or short cut method.

MECHANICAL OPERATION WHEN KEYS 2 TO 5 ARE OPERATED

As a multiply key, such as for the digit "three" (FIGS. 9 and 9A) is depressed, the pawl 74, pivoted to the key stem 68, contacts and depresses arm 76 and causes its block arm 77 to be positioned in the path of ears 78 on slide 79. The arm 76 also lies in a slot 84 in a comb plate 85 which is also pivotally mounted on rod 80. There are five slots 84 in the comb plate 85 to receive arms 76 related to keys 1, 2, 3, 4 and 5. At its ends the comb plate has forwardly extending harms 86 and 87 which respectively are adapted to operate the motor drive control bellcrank 88 (FIG. 9) and the multiply non-print bellcrank 89 (FIG. 10) through the respective offset arms 90 and 91 as said comb is rocked by the depression of a key (FIGS. 9 and 12).

As the multiply non-print bail 89 rotates clockwise (FIG. 10) it will position the multiply mechanism operating slide 92 rearward (FIG. 10). The slide 92 has an ear 93 thereon. Slidably attached to the front of wall 59 (FIG. 1) by slots 94 and studs 95 (FIGS. 1, 8 and 10) is the key stem bellcrank operating slide 79. The right hand lower edge of slide 79 has teeth 96 engageable by the end of a latch pawl 97 pivoted on the wall 59 and normally urged into engaging relation with the teeth by a spring 98. An upright arm 99 of the pawl 97 has a stud 100 extending rearwardly through a hole 101 in wall 59. Back of wall 59 is an elongate link 102 slotted at 103 to ride on a stud 104 (FIG. 10) fastened to the back of wall 59. This link at its right end has an upright finger 105 which is adapted to engage the stud 100 to move it to the right and depress the pawl 97 against the action of spring 98 fastened at one end to pawl 97 and at the other to the front face of wall 59. One end of link 102 is slotted to receive the end of arm 107 of a bail 108 rotatable on rod 109 which is supported from upper wall 60 and cross plate 70 (FIG. 1). This bail 108 also has an extension 110 at its upper end which normally lies in front of ear 93 on link 92. When the link 92 is moved rearward the ear follows and bail 108 is turned by reason of the pull of a spring 111 (FIG. 10) fastened at one end to link 102 and at the other end to the back of wall 59. It will thus be seen that upon continued movement of link 92 to the rear, extension 110 will be rotated by spring 111 acting on slide 102, thus permitting arm 105 to follow, relieving the stud 100 of pressure from arm 105 thus allowing pawl 97 to be swung by spring 98 into place to engage the teeth of the slide 79. When the link 92 moves forward again the reverse operation takes place and the pawl 97 is disengaged and the slide 79 is snapped back to normal by the spring 112 (FIG. 1) fastened at one end to the slide and at the other to the front face of the wall 59. How the slide 79 is advanced step-by-step will now be set forth.

When the motor drive bellcrank 88 is rocked clockwise (FIGS. 9 and 9A) an arm 113 thereon moves down and pulls down a link 114 having a pin and slot connection 115 with a nose 116 on the front end of a link 117. The nose 116 is connected by spring 114' to the link 114. This disposes the nose 116 in the path of a roller 118 on a link 119 whereby link 117 is moved rearwardly when the link 119 moves rearwardly. As bellcrank 88 rocks clockwise (FIG. 9) a link 120 attached to the upper end of its arm 121 is moved rearwardly and carries a roller 122 rearwardly. This roller 122 contacts a control arm 123 pivoted to the lower end of key stem release arm 124 and lifts said arm 123 from engagement with roller 125 on a gear arm 126 fastened to the universal drive shaft 127. The release of arm 124, dependent from bail 128, will permit the clockwise movement of key lock bail 129 through the action of link 119 and spring 130 fastened to a frame of the machine. This bail 129 will then move in over the extension 71 of the depressed key and hold it down until released. As link 119 moves rearward its roller 118, engaging depressed nose 116, will move link 117 rearwardly. The rear end of this link 117 is attached to the upper end of a motor control latch lever 131 which is rocked clockwise (FIG. 9) to release motor drive control arm 132 which, by spring 133, is rocked clockwise and its end presses on stud 134 on one arm of a three arm bellcrank 135 pivoted to the frame of the machine at 136, to rock this crank counterclockwise (FIG. 9) to start the motor through arm 138 and link 137 (FIG. 7). This crank 135 and link 137 are the same as crank 54 and link 45 shown in FIG. 5 of Patent 2,237,881 above, and operate to start the motor in the manner described therein.

In order to keep the latch 131 from engaging the lip 158 on the motor control arm 132 until the end of a multiplying operation and/or a total taking operation, the following operation takes place: As the gear arm 126 rotates counterclockwise (FIG. 9) the stud 126' thereon encounters the front upright extension 132" on the arm 132 and lifts this arm. As the arm 132 is lifted, a raised portion 132' on the upper edge of arm 132 encounters a stud 131' on the lower end of the latch 131 to move it to the front away from the lip 158 on the arm 132. As the arm 126 returns, the stud 126' releases the extension 132' of arm 132 and the spring 133 pulls the motor control arm downwardly, so that this arm may start another cycle of operation.

As long as the latch lever 131 is held forward by the rearward position of the link 117, the latch 131 cannot engage the lip 158 on the motor arm 132. However, when the link 117 is moved forwardly the spring 157 will move the latch member 131 rearwardly to be in a position to engage with the lip 158. However, if the mechanism has to go through further strokes the raised portion 132' on the arm 132 does move the latch back to permit the further operation. When the motor strokes are ended then the arm 132 dropping from its high position will be caught by the latch.

As the motor operates, the backspace cam 56 will turn clockwise (FIG. 13A). To this cam is connected a link 139 extending to an elongate stud 139' on an arm 140 fixed on the universal drive shaft 127. The oscillation of this drive shaft 127 will rock the bevel gear 141 on its end and this gear meshes with a similar gear 142 (FIGS. 2 and 10) fixed to a stub shaft 143 journalled between spaced laterally extending flanges 67' of the multiplier unit keyboard frame. A yoke 144 fixed to stub shaft 143 has an upright arm 145 with a lateral stud 146 on which is pivoted a bail 147 having an extended actuating pawl 148 adapted to engage the teeth 96 on the slide 79 and pull it to the right, as viewed in FIG. 10. As the stub shaft 143 rocks clockwise in FIG. 10, the arm 145 so moves and lifts the pawl 148 to engage the teeth 96. The pawl 148 has a tail piece 149 to which is connected a spring 150 the other end of which is connected to a pin 151 fixed on the arm 145. The bail 147 has a tail 152 which limits the pin 151. As the arm 145 restores to normal the pawl 148 is lowered out of engagement with the teeth 96. Thus the slide is moved one space to the right on each machine operation, in which position it will be latched by the pawl 97.

In respect to keys 2 to 9, inclusive, the ears 78 on slide 79 contact block arms 77 on the next to the last multiply stroke and releases the arm 76 from the key stem pawl 74 as above mentioned. This allows the key stem comb 85 to restore and in turn permits the non-print bellcrank 89 to restore. The bellcrank 88 is prevented from restoring at this time because a spring 153 (FIG. 9A) will pull down cyclically operated latch 154 to latch over an ear 155 on link 120 to prevent the return of the link 120. This latching is effected on every forward stroke of the main shaft since the arm 126 (FIG. 9A) moves thus downward at that time and through pin 156 permits latch 154 to drop and engage the ear 155. This prevents the motor drive control arm 132 from being latched by the motor control latch 131. Control arm 123 will also be held up by contact with roller 122 on link 120, thus remaining above roller 125 on gear arm 126 and preventing the multiply key from being unlatched by key stem latch 129.

It was stated that comb 85 was restored on the forward stroke of the next to the last multiplying cycle of the machine. At this time latch 154 is holding link 120 rearwardly, preventing it from restoring. However, on the return stroke of this cycle the gear arm 126 will rotate clockwise and lift pin 156 on latch 154 to release latch from ear 155 and allow link 120 to restore. This will restore bellcrank 88 and as it does link 114 will rise and lift nose 116 from behind roller 118, allowing spring 157 to move the motor control latch 131 to the rear to enable it to latch under lip 158 on the motor control arm 132 at the end of the following main shaft stroke. On the last forward stroke of the multiplying cycles as gear arm 126 on the universal drive shaft 127 moves downward, the control arm 123 will drop behind the roller 125 on said arm 126 and on the return stroke the roller 125 will drive the arm 123 to the rear and through arm 124 rock bail 128 counterclockwise, thus driving link 119 forward and unlatching the multiply key 58 which will tend to restore under the tension of its own spring 159 (FIG. 9). The machine will print and backspace on this stroke, as disclosed in Patent 2,726,037 above.

MULTIPLIER AND QUOTIENT RACK
(FIGS. 13 AND 13A)

There is only one rack in this machinne used for printing the digits of the multiplier and the quotient, whereas in former machines one rack was used for division and a separate one for multiplication. In this machine the digits for quotients are disposed on one side of the rack in the usual manner starting with zero at the top and consecutively downward. On the other side of the rack the digits for multplication are disposed in a novel manner. The zero digit is at the top, followed below by the decimal point symbol. Below these in order are one, two, three, four, five, nine, eight, seven and six. To print zero the rack must be lowered one space. To print the first five digits the rack initially is raised one space. To print any of the short cut digits such as nine, eight, seven and six, the rack is initially raised five spaces to the "5" position.

(A) *Multiply Keys "One" Through "Five"*

Since there are no extra cycles in this machine when multiplying with digits from one to five it is necessary to initially position the rack before the regular rack feeding mechanism takes effect. When one of the above mentioned keys is depressed, as stated before, the non-print bellcrank 89 (FIG. 13) rocks counterclockwise and moves the operating slide 92 rearwardly. As slide 92 thus moves the cam surface on the upper edge thereof cams against a roller 296 on arm 297 extending from the cam limit plate 298. This rocks the plate 298 counterclockwise. This plate has two steps thereon 299 and 300 and this rocking movement places the step 300 beneath an ear 301 on a vertical link 302 since this ear normally rests on the step 299 of the plate 298. This link 302 (FIG. 13) is normally urged down by a spring 303. As the link is thus allowed to move down one step the nose 304 thereof (FIG. 13D) contacts stud 305 on arm 306 fixed to multiply type drive shaft 307, thus rocking said shaft and moving up an arm 308 pinned to said shaft. This arm 308 has a roller 309 thereon which lies beneath the bottom of the M and Q rack 310. Thus the rack is moved up one space prior to the forward stroke of the first cycle of the machine. At the same time as shaft 307 is rocked to move up arm 308, an arm 311 (FIG. 13A) on its right hand end is also moved down and by means of a roller 312 thereon will rock the repeat shaft bail 313 counterclockwise to raise the rod 314 and prevent the restoration of the pin carriage. This rod and similar associated mechanism is shown in Patent 2,237,881 (FIG. 18) and in FIG. 7 of Patent 2,726,037.

As the slide 92 (FIG. 13) moves rearwardly its forward end 291 contacts an arm 315 of a bellcrank the other arm 316 of which acts as a latch. This bellcrank is loosely pivoted on a stub shaft 317 fastened to the frame plate 33. This latch arm 316 when actuated releases bail member 318 which is loosely pivoted on shaft 319 and is then spring urged anti-clockwise by spring 318a to place the lower end of an arm 320 thereon over a lateral ear 321 on the rack 310. This will prevent the rack from overthrowing its initial one space movement. The amount of rocking motion given to the bail 318 is determined by the position of a latch control-arm 322 which has two steps 323 and 324 thereon adjacent a roll 325 on an arm 326 dependent from the bail member 318. When keys 58 (FIG. 4A) from "1" to and including "5" are depressed the control arm 322 remains in normal position so that when the bail 318 is released its dependent arm 326 will be limited by step 323 on said arm and the action will take place as above stated to allow the rack to move up only one step, thereby placing the "1" digit at the printing line.

Near the end of the forward stroke the backspace cam 56 (FIG. 13) will contact the laterally turned lower end 327 of an arm of a bellcrank the other arm of which 328 is a latch which, when lifted thus, releases the type carrier retaining pawl bail 329 loose on shaft 329' and, under influence of spring 330 will move into position to hold the rack as it is lifted, in the usual manner. The lower dependent arm 331 of pawl bail 329, as said pawl bail is released, will move rearward and strike the dependent extension 332 of the bail member 318 to restore it until it is latched by the latch arm 316, so that the arm 320 of the bail member 318 will not block the rack. This sequence is very important because failure to get the type carrier limiting arm 320 out of blocking position before the M and Q rack feeds up step-by-step may cause the regular M and Q rack feed mechanism to be broken or thrown out of adjustment.

Simultaneously with the movement of arm 327 by the backspace cam 56, this movement will permit spring 333 (FIG. 6A) to move the multiply type drive arm latch 334 rearwardly. The lower part of this latcth is hooked to engage under latch arm 335 (FIG. 13D) fixed to shaft 307 to hold said shaft in its rocked position and thereby keep the rod 314 (FIG. 13A) lifted to prevent restoration of the pin carriage. Referring to FIGS. 13 and 13C, as above described when the bail 329 is released to move the rack retaining pawl to engage the rack 310, the end of the latch arm 328 will lie on top of a lateral ear 329" to hold the lower arm 327 rearwardly. When the rack retaining pawl and the bail 329 are released in a manner well known in Remington Rand calculators, the ear 329" will move forwardly and allow the end of latch 328 to drop under the influence of its spring to move lower arm 327 forwardly and contact the latch 334 to unlatch it. The releasing means for the rack retaining pawl is shown in FIGS. 13 and 30 of Patent 2,237,881, supra, and particularly with reference to the disabling hook 161.

(B) *Multiply Keys 6 Through 9*

The machine operates by the short cut method when multiplier keys 6 through 9 are used. For example, when multiplying by 9 the machine will take two multiplying cycles. To obtain proper initial printing position, the M and Q rack is initially positioned up five spaces, whence it will then be fed up step-by-step. This initial setting of the rack, before regular step-by-step feeding begins, is accomplished as follows: When a short cut multiply key is depressed, as previously explained, the arm 198 is rocked and a dependent arm 336 thereon (FIG. 13A) will be moved rearward. This arm has a stud 337 riding in a slot 338 in link 339. A yield spring 340 connects the stud and the link. Link 339 will be moved rearward and its rear end is hooked as at 341 to embrace and slide on stub shaft 342 (FIG. 13) which also receives the slot 343 in the lower end of the link 302. This end of the link 339 has an upper projection or ear 344 which is adapted to engage a stud 345 (FIG. 13B) on the side of plate 298 rocking this plate counterclockwise so that step 300 on said plate will be moved out of the path of the ear 301 on the link 302 which will then move all the way down and limit on the stub shaft 342. This will cause nose 304 of link 302 (FIG. 13) to contact stud 305 and through arm 306 (FIG. 13D) rock shaft 307 a greater distance to lift the rack 310 five spaces bringing it with the digit "five" in printing position. As the plate 298 is rocked, a dependent arm 346 thereon will engage an end plate 347 on the front end of control arm 322 to lift said arm to present the step 324 in the path of roll 325 on arm 326 of bail 318. This will block the movement of bail 318 so as to present the shoulder 348 on arm 320 to block the rack 310 from overthrowing after its initial five space movement. Nose 349 (FIG. 13B) on plate 298 will hold the outer back space pawl 350 to the rear to permit backspacing on the first return stroke. Near the end of the forward stroke, the stud 195 (FIG. 11) of the drive shaft arm 140 will contact pawl 189 rocking it counterclockwise free of the extension 190 of latch 191, which will then move up and relatch the drive pawl 193.

(C) *Multiplying by "0"*

To get the zero into printing position it is necessary to lower the M and Q rack 310 one space. This is accomplished as follows: In its normal position the rack 310 rests on roll 309 on the arm 308 on shaft 307. Shaft 307 is normally held in position by roll 305 limiting against a cam slope 351 (FIG. 13A) on zero type drive slide 352. This slide is connected at one end to the upper end of arm 354 on bellcrank 294 which, as stated above, is rocked when the zero key is depressed. The rearward movement of slide 352 removes the cam slope 351 from over the stud 305 on arm 306 fixed to shaft 307. Spring 357 connected to latch arm 335 fixed to shaft 307 will rock said shaft 307 counterclockwise (FIG. 13) to swing arm 308 and allow rack 310 to drop one space, thus bringing the zero symbol thereon into printing position (FIG. 13).

As the slide 352 (FIG. 13A) moves rearwardly upon the depression of the zero key, a step 358 on an elevated portion 359 thereof will be disposed under ear 301 of the link 302 so that this link cannot drop and rock shaft 307 to lift the rack 310.

RESTORATION OF CARRIAGE WHEN MULTIPLYING BY 1

The purpose of pawl 360 (FIG. 13A), which is pivoted to the stud 361 which in turn connects link 139 to the backspace cam 56, is to pick up and restore the link 302 immediately on the first return stroke to enable the stop section to restore when multiplying by "1," if a significant figure is in the units column or the release key is used. The pawl 360 is urged clockwise by a yield spring 362 wrapped around the stud and is connected to the pawl at one end and to the stud 363 on the backspace cam 56 at the other end. The pawl 360 has a rear dependent finger 364 (FIGS. 6A and 13A) limiting against the stud 363 on the backspace cam 56. The pawl is held in its raised position as shown in FIG. 13A by a latch arm 365 pivoted on a pin 366 on the frame plate 33 and arm 365 has a limiting finger 367 limiting against pin 368 on the frame plate 33. A spring 369 connected at one end to pin 368 and at the other to the latch arm 365 urges the arm into latching position with the pawl 360. The operation of pawl 360 is as follows: As the backspace cam 56 rotates clockwise (FIG. 13) the pawl 360 will move down with it. The stop 370 of pawl 360 will swing around and under roll 371 (FIG. 13) on an arm 372 pivoted on shaft 207 against the resistance of yield spring 362. Reference to FIG. 13A will show that when the backspace cam 56 moves downwardly it will carry the pawl 360 with it, and this pawl will be swung initially counterclockwise because it is temporarily held by the pawl 365. This will cause the outer end of pawl 360 to bear against the top of roll 371 and the swinging movement of the pawl 360 will cause the step 370 thereon to lie under the roll 371 so that it will push up on the roll 371 when the cam 56 returns to normal. The lever 372 has a stud 372' thereon which is connected to the upper end of the link 302. It will be noted that the cam 56 has a stud 372" thereon which, in the normal position of said cam shown in FIG. 13, will support the outer end of lever 372. On the return stroke the step 370 will pick up the roll 371 and restore the link 302 at the very beginning of the return stroke. This will cause nose 304 of link 302 to release stud 305 on arm 306 (FIG. 13C) so that shaft 307 and multiply repeat bail will restore, thus lowering the rod 314 permitting the pin carriage to restore if it is not prevented from doing so by other means.

M AND Q RACK SNUBBER MECHANISM
(FIGS. 5A and 14)

This mechanism is provided to prevent the M and Q rack 310 from bouncing when restoring downward to normal position. The snubber arm 373 depends from a bail member 374 pivoted on the hammer trip shaft 319. The snubber is held in operative position by the spring 376, one end of which is connected to the bail and the other end to the comb 377. The bail has a finger 378 limiting against comb 377 to limit the clockwise rocking of the snubber arm 373. The bent lower end of the arm 373 is disposed just above the lateral ear 321 on the rack 310. In order for the rack to move upward it merely cams the arm 373 to the front. The tension of the spring 376 is sufficient to prevent the M and Q rack 310 from bouncing as it normalizes downward but is not so strong as to interfere with the elevation of the rack.

MULTIPLICATION INTERLOCK

Depression of the division key 57 pushes the rear of printing hammer catch block arm 412 (FIG. 15) below lateral extension 413 on hammer catch arm 414 dependent from bail 415 which is rocked by a spring to shift the hammer latches 416 so that the quotient hammer is unlatched and the multiplier hammer is latched, by engaging with studs such as 417 (FIG. 5) on the hammers 50. As bail 415 is thus rocked loosely on shaft 211 it pushes forwardly the multiply interlock bail operating link 418, one end of which is connected to bail 415 below its pivot shaft and the other end of which is connected to a pin 419 on arm 420 loose on shaft 286 and supporting multiply interlock bail 398 which is thereby rocked counterclockwise. The other end of bail 398 is connected to an arm 421 loosely dependent from shaft 286 and which has a lateral ear 422 which is swung rearwardly to trip key stem interlock retaining pawl 423 off of stud 424 on an arm 425 fixed to universal drive shaft 127. Pawl 423 is supported from the rear of key stem interlock plate 395 which is then pulled down by spring 426 so that its front extension 427 is disposed between the key lock rollers 396 blocking the multiply keys from being depressed during division operations. This plate is kept down until the bail arm 414 is restored by the stud 428 on the rear end of the total slide 239 as it moves to the rear on a total operation. This release permits the pawl 423 to drop back to normal position over the stud 424 whereby, on the return stroke of that cycle, the stud will lift the pawl 423 and its associated interlock plate 395 and thus unlock the multiply keys 58.

In this machine for printing a "zero," when the zero multiplier key is depressed, the M and Q rack is depressed initially one space. When the keys from "one" to "five" are depressed the same rack is initially lifted one space. When the keys from "six" to "nine" are depressed this same rack is initially lifted five spaces.

Mechanism is provided for automatically preventing the overthrow of the rack in moving to either the "one" position or the "five" position initially.

While there is above described but one embodiment of the invention, it is possible to produce still other embodiments without departure from the inventive concept above disclosed, and it is, therefore, desired that only such limitations shall be imposed on the appended claims as are stated therein.

I claim:
1. In a machine of the class described having a vertical movable multiplier and quotient printing rack disposed in a normal position and a series of multiplier keys, said series including a first certain group of keys and a second certain group of keys; a rock shaft, an element fixedly mounted on said rock shaft and disposed to support said rack when in said normal position, a link operatively connected to said shaft, a spring biasing said link to rock said shaft, a rock plate having two steps, formed thereon one of which steps normally holds said link in an inoperative position against said spring bias, means operable under conditions where any one of said first certain group of multiplier keys is depressed to rock said plate to move said one step from said link holding position and place the other of said steps into position to limit movement of said link permitting movement of said link by said spring to rock said shaft and move said rack a predetermined distance, and means operable when any one of said second certain group of keys is depressed to rock said plate to remove both said steps from link holding position permitting movement of said link by its spring to rock said shaft a certain distance causing movement of said rack a certain distance greater than said predetermined distance.

2. In a machine of the class described having a vertically movable multiplier and quotient printing rack disposed in a normal position and a series of multiplier keys, said series consisting of a certain key, a first certain group of keys and a second certain group of keys; a rock shaft, an element fixed to said rock shaft and disposed to support said rack, a first link operatively connected to said shaft, a spring biasing said link to rock said shaft in a direction to cause said fixed element to raise said rack, a rock plate having two steps, one of which steps normally holds said first link in an inoperative position against said spring bias, means operative when any one of said first certain group of multiplier keys is depressed to rock said plate to move said one of said steps out of said link holding position and place the other of said steps into position to limit movement of said first link permitting said first link to rock said shaft and move said rack a predetermined distance, means operative when any one of said second certain group of said multiplier keys is depressed to rock the plate to remove both said steps, from said first link holding positions permitting said first link to move and rock such shaft a certain distance greater than said predetermined distance to move the rack said certain distance, a latch arm fixed to said rock shaft said arm being spring biased to rock said shaft in a direction opposite to said direction, holding means for holding said latch arm against movement, said holding means being operative when said certain key is depressed for releasing said latch arm to lower said rack a certain distance, said holding means including a slide link adapted to prevent movement of said first link when said holding means become operative.

3. In a machine of the class described having a vertically movable multiplier and quotient printing rack disposed in a normal position and a series of multiplier keys; a rock shaft, an element fixed to said rock shaft to support said rack, a vertically disposed link associated with said shaft, a spring urging said link downward, an arm fixed to said shaft, a nose on said link disposed to engage said arm and rock said shaft in a first direction to raise said rack when said link is spring actuated, a type drive slide adapted to be operated when a certain one of said keys is depressed and having a blocking surface thereon, an ear on said first link, said blocking surface being disposed under said ear when said drive slide is moved to operative position to prevent said first link from moving downward, a cam surface on said drive slide engaging said arm to prevent movement of said rock shaft in a direction opposite to said first direction, said cam surface being movable to release said arm when said drive slide is operated in response to depression of said certain key, and a spring biasing said rock shaft to rock it in said opposite direction and cause said rack supporting element to move downward a certain distance permitting said rack to follow such movement.

4. In a machine of the class described, having a multiplier and quotient printing rack movable vertically from a normal position and a series of multiplier keys including a certain group of keys; a rock shaft, an element fixed to said rock shaft and disposed to support said rack, a vertically movable first link, an arm fixed to said shaft, a nose on said first link in engagement with said arm, a spring biasing said first link downward to move said arm and rock said shaft in a direction to cause said support element to raise said rack, an ear formed on said first link, a rock plate having two steps, one of which steps limits against said ear to hold said first link in said normal position against said spring bias, and a second link operatively connected to said rock plate and operable in response to depression of any of one of said certain group of said keys to rock said plate and move both said steps out of link limiting position permitting said first link to rock the shaft and move said rack upward a certain distance.

5. In a machine of the class described having a multiplier and quotient printing rack movable vertically from a normal position to at least two predetermined preprinting positions in preparation for printing, said rack being provided with a lateral ear at the bottom, a plurality of multiplier keys including a first certain group of keys and a second certain group of keys; means responsive to depression of any key of said first certain key group for raising said rack to one of said predetermined preprinting positions, means responsive to depression of any key of said second certain key group for raising said rack to another of said preprinting positions, a pivoted bail having a plurality of blocking shoulders, means responsive to said depression within said first key group to position one of said blocking shoulders over ear of said rack to stop movement of said rack at said one preprinting position, and means responsive to said depression within said second certain key group to position another of said blocking shoulders over said rack ear to stop movement of said rack at said another preprinting position.

6. In a machine of the class described, having a multiplier and quotient printing rack movable vertically from a normal position to at least two predetermined preprinting positions, said rack being provided with a lateral ear at the bottom, a series of multiplier keys including a first certain group of keys and a second certain group of keys; means responsive to depression of any key of said first key group to raise said rack to a first one of said preprinting positions, means responsive to depression of any key of said second key group to raise said rack to a second one of said preprinting positions, a pivoted bail, a block arm fixed to said bail, said arm having a pair of spaced apart blocking shoulders formed thereon for limiting movement of said rack, means responsive to said depression of any key of said first group to position one of said blocking shoulders over the rack ear to stop movement of said rack at said first preprinting position, means responsive to said depression of any of keys of said second group to position the other of said blocking shoulders over said rack ear to stop movement of said rack at said second preprinting position, a dependent limit arm fixed to said bail, a control arm having two limiting steps thereon at different distances normally from the limit arm, one of which steps is positioned for engagement by said limit arm, under conditions where any first group key is depressed, to limit bail movement; means responsive to depression of any key of said second group to actuate said control arm to position to present the other of said steps in the path of said limit arm to limit bail movement.

7. In a machine of the class described, having a vertically movable multiplier and quotient printing rack with a lateral ear formed on the rack, a cyclically driven main drive shaft, a back space cam mounted on said drive shaft, and a series of multiplier keys; a pivoted first bail having blocking shoulders, adapted to be selectively disposed in the path of the ear to limit upward movement of said rack, means operatively responsive to depression of any of certain one of said keys to raise said rack, said key responsive means also pivoting said first bail to place a selected one of said blocking shoulders in rack limiting position and a rack retaining second bail, means operated by said back space cam at the end of the forward stroke thereof to swing said second bail into rack engaging position to retain said rack, said second bail having a dependent arm adapted upon actuation of said second bail to said retaining position to actuate said first bail out of rack limiting position.

8. In a machine of the class described having a vertically movable multiplier and quotient printing rack, a series of multiplier keys, a backspace cam, and cyclically driven mechanism to drive said cam; means operated by depression of selected ones of said keys to raise said rack predetermined respective distances associated with said selected keys, a first bail having a plurality of blocking shoulders for limiting movement of said rack, means operatively responsive to depression of said selected keys to dispose said blocking shoulders differentially in position to limit movement of said rack to prevent overthrow thereof, a limiting arm fixed to said first bail, a control arm having a plurality of limiting steps, thereon at different distances normally from said limiting arm means operatively responsive to depression of said selected keys to position selectively said steps of said control arm in the path of said limiting arm to determine the distance through which said bail is moved, a second bail operable for retaining said rack, means operated by said backspace cam to actuate said second bail into rack retaining position, said second bail having a depending portion adapted to pivot said first bail, when said second bail is actuated to retaining position, to swing said bail out of rack blocking position.

9. In a machine of the class described having a multiplier and quotient printing rack movable linearly from a normal position to a certain position; a lateral ear formed on said rack; a pivotally mounted bail; a limit finger on said bail; a surface in the path of said limit finger to act as a stop limit for said limit finger, a spring biasing said bail to limit said limit finger against said stop surface; a snubber arm also disposed on said bail and having an end portion yieldably engaging said lateral ear of said rack, under conditions where said rack is in said normal position and said bail is biased against said stop, to permit movement of said rack from said normal position towards said certain position, said yieldable engagement being such as to cause pivoting of said bail by such rack movement.

10. In a machine of the class described having a vertically movable multiplier and quotient printing rack disposed in a normal position and a series of multiplier keys, said series including a certain group of keys; a rock shaft; an element fixedly mounted on said rock shaft and disposed to support said rack; a link operatively connected to said shaft to rock the same; a spring biasing said link to rock said shaft; a rock plate having two steps, one of which normally holds said link in an inoperative position against said bias of said spring; and means operated when any one key of said certain group of keys is depressed to rock said plate to move said one of said steps out of said link holding position and place the other of said steps in position to limit spring-urged movement of said link causing said link to rock said shaft and move said rack a predetermined distance.

11. In a machine of the class described having a vertically movable multiplier and quotient printing rack disposed in a normal position and a series of multiplier keys, one for each of the digits "zero" to "nine" inclusive; a rock shaft; an element fixedly mounted on said rock shaft and disposed to support said rack; a link operatively connected to said shaft; a spring biasing said link downward; an arm on said shaft; a nose on said link to engage and move said arm and rock said shaft when said link is moved; an ear on said link; a rock plate having two steps, one of which engages said ear to hold said link in an inoperative position against the biasing force of said spring under conditions where said rack is in said normal position; an arm on said rock plate; and a slide movable a predetermined distance by the depression of any one of said keys provided for the digits "one" to "five" inclusive to contact said arm and rock said plate to move said one of said steps out of said holding engagement with said ear and place the other of said steps in position to engage said ear to hold said link, said link being urged downward by said spring one step to place said ear into holding engagement with said other of said steps to rock said shaft and move said rack up one step.

12. In a machine of the class described having a multiplier and quotient rack, a series of multiplier keys, a backspace cam, and a cyclically driven main drive shaft upon which said cam is mounted; a rock shaft, an arm thereon to raise said rack, a latch arm on said shaft, means operated by the depression of certain keys of said series of keys to rock said shaft and raise said rack, a latch member, a spring biasing said latch member, latching means holding said latch member inoperative, said latching means being actuated by movement of said backspace cam to release said latch member on the initial portion of the backspace cam stroke to cause said latch member to engage said latch arm and hold said shaft rocked for a certain number of cycles of operation, a block arm associated with said rack, means operated by said certain keys to dispose said block arm differentially in position to block said rack to prevent overthrow thereof, a limiting means associated with said block arm, a control arm associated with said limiting means and having a plurality of limiting steps thereon at different distances from said limiting means, means operated by the depression of said certain keys to position said steps of said control arm in the path of said limiting means to determine the distance through which said block arm is moved, a rack retaining bail, means operated at the end of the forward stroke of said backspace cam to swing said bail into rack engaging position; and a portion of said bail, when operated, adapted to contact a portion of said block arm to swing said block arm to inoperative position.

13. In a machine of the class described, having a multiplier and quotient rack, a series of multiplier keys, a backspace cam, cyclically driven mechanism to drive said cam, and a push rod; a rock shaft, an arm thereon to engage and raise said rack, a latch arm on said shaft, a second arm on said shaft and associated with said push rod to elevate the same, means operated by the depression of certain keys of said series of keys to rock said shaft and raise said rack and to elevate said push rod, a latch member, a spring biasing said latch member, and latching means holding said latch member inoperative, said latching means being responsive to movement of said backspace cam on the initial portion of the stroke to release said latch member to engage said latch arm and hold said shaft rocked for a certain number of cycles of operation.

14. In a machine of the class described, having a division key, a multiplier and quotient printing rack, said rack having multiplier digit symbols and quotient digit symbols formed thereon, a pair of printing hammers associated with said rack, one hammer of said hammer pair being for printing said multiplier digit symbols and the other hammer for printing quotient digit symbols, a pair of hammer latches, one for each of said hammers and selectively effective to latch their respective associated said hammers alternately, said latches being normally disposed to latch said hammer provided for said quotient digit symbols to permit printing of multiplier digit symbols, and means operated in response to actuation of said division key causing said latches to unlatch said hammer provided for said quotient digits symbols and latch said hammer provided for said multiplier digit symbols to permit printing of quotient digit symbols.

References Cited in the file of this patent

UNITED STATES PATENTS

| | | |
|---|---|---|
| 1,349,049 | Crumpton | Aug. 10, 1920 |
| 1,376,518 | Duckstine | May 3, 1921 |
| 1,801,902 | Britten | Apr. 21, 1931 |
| 2,035,590 | Campos | Mar. 31, 1936 |
| 2,149,371 | Uhlig | Mar. 27, 1939 |
| 2,152,199 | Machado | Mar. 28, 1939 |
| 2,153,299 | Dahlberg | Apr. 4, 1939 |
| 2,308,940 | Sundstrand | Jan. 19, 1943 |
| 2,390,041 | Avery | Dec. 4, 1945 |
| 2,391,089 | Friden | Dec. 18, 1945 |
| 2,485,695 | Carlstrom et al. | Oct. 25, 1949 |
| 2,531,089 | Turck | Nov. 21, 1950 |
| 2,588,127 | Laiho | Mar. 4, 1952 |
| 2,615,622 | Anderson | Oct. 28, 1952 |
| 2,635,808 | Stowell et al. | Apr. 21, 1953 |
| 2,682,371 | Benninger | June 29, 1954 |
| 2,726,037 | Landsiedel | Dec. 6, 1955 |

FOREIGN PATENTS

| | | |
|---|---|---|
| 693,679 | Great Britain | July 1, 1953 |